(12) United States Patent
Knopp et al.

(10) Patent No.: US 10,794,619 B2
(45) Date of Patent: Oct. 6, 2020

(54) COMPRESSOR WITH MOTOR COOLING

(71) Applicant: Daikin Applied Americas Inc., Minneapolis, MN (US)

(72) Inventors: Joseph Layton Knopp, Staunton, VA (US); Jeffrey Allen Morgan, Fishersville, VA (US); Ronald J. Formosa, Jr., Waynesboro, VA (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 235 days.

(21) Appl. No.: 15/787,056

(22) Filed: Oct. 18, 2017

(65) Prior Publication Data
US 2018/0038617 A1 Feb. 8, 2018

Related U.S. Application Data

(63) Continuation of application No. 15/072,975, filed on Mar. 17, 2016, now Pat. No. 9,822,998.

(51) Int. Cl.
*F25B 31/00* (2006.01)
*F04D 25/06* (2006.01)
(Continued)

(52) U.S. Cl.
CPC ........ *F25B 31/008* (2013.01); *F04D 25/0606* (2013.01); *F04D 29/053* (2013.01);
(Continued)

(58) Field of Classification Search
CPC .. F25B 31/008; F04D 25/0606; F04D 29/053; F04D 29/058; F04D 29/5806;
(Continued)

(56) References Cited

U.S. PATENT DOCUMENTS

| 3,645,112 A | 2/1972 | Mount et al. |
| 3,805,547 A | 4/1974 | Eber |

(Continued)

FOREIGN PATENT DOCUMENTS

| EP | 1 522 749 A1 | 4/2005 |
| JP | 1-138946 A | 5/1989 |

(Continued)

OTHER PUBLICATIONS

International Preliminary Report on Patentability including Written Opinion for the corresponding international application No. PCT/US2017/022058, dated Sep. 18, 2018.
(Continued)

*Primary Examiner* — Joseph F Trpisovsky
(74) *Attorney, Agent, or Firm* — Global IP Counselors, LLP

(57) ABSTRACT

A compressor includes a compression mechanism, a shaft, a motor, and a cooling medium delivery structure. The motor includes a rotor mounted on the shaft and a stator disposed radially outwardly of the rotor to form a gap between the rotor and the stator. The cooling medium delivery structure includes inlet and outlet conduits located to supply and discharge a cooling medium to and from the motor. The shaft has an external shape different than an internal shape of the rotor to form at least one axial passageway between the shaft and the rotor. The cooling medium is supplied through the gap and the at least one axial passageway to cool the rotor.

25 Claims, 21 Drawing Sheets

(51) Int. Cl.
  *F04D 29/053* (2006.01)
  *F04D 29/058* (2006.01)
  *H02K 1/32* (2006.01)
  *H02K 7/00* (2006.01)
  *H02K 9/19* (2006.01)
  *H02K 1/20* (2006.01)
  *F04D 29/58* (2006.01)

(52) U.S. Cl.
  CPC ....... *F04D 29/058* (2013.01); *F04D 29/5806* (2013.01); *H02K 1/20* (2013.01); *H02K 1/32* (2013.01); *H02K 7/003* (2013.01); *H02K 9/19* (2013.01)

(58) Field of Classification Search
  CPC .......... F04D 29/58; H02K 1/32; H02K 7/003; H02K 1/20; H02K 9/19
  USPC .......................................................... 62/505
  See application file for complete search history.

(56) References Cited

U.S. PATENT DOCUMENTS

| | | | |
|---|---|---|---|
| 4,573,324 A | 3/1986 | Tischer et al. | |
| 4,669,279 A | 6/1987 | Maeda et al. | |
| 4,903,497 A | 2/1990 | Zimmern et al. | |
| 6,009,722 A | 1/2000 | Choi et al. | |
| 8,516,850 B2 | 8/2013 | Jadric et al. | |
| 2009/0205360 A1 | 8/2009 | Haley et al. | |
| 2011/0081263 A1 | 4/2011 | Yoshino et al. | |
| 2012/0107143 A1 | 5/2012 | Gilarranz et al. | |
| 2013/0257195 A1* | 10/2013 | Airoldi | H02K 9/02 310/53 |
| 2014/0260376 A1 | 9/2014 | Kopko et al. | |
| 2016/0013704 A1* | 1/2016 | Wagner | H02K 1/32 310/54 |
| 2016/0047575 A1* | 2/2016 | Jonsson | F25B 1/053 62/117 |
| 2017/0146271 A1* | 5/2017 | Hasegawa | F04D 29/058 |

FOREIGN PATENT DOCUMENTS

| | | |
|---|---|---|
| JP | 1-249997 A | 10/1989 |
| JP | 9-42196 A | 2/1997 |
| JP | 2002-537748 A | 11/2002 |
| JP | 2009-270797 A | 11/2009 |
| JP | 3166447 U | 3/2011 |
| WO | 2008/045413 A2 | 4/2008 |

OTHER PUBLICATIONS

The International Search Report for the corresponding international application No. PCT/US2017/022058, dated Jun. 22, 2017.

* cited by examiner

COMPRESSOR WITH MOTOR COOLING

CROSS REFERENCE TO RELATED APPLICATIONS

This application is a continuation application of U.S. patent application Ser. No. 15/072,975, allowed, filed on Mar. 17, 2016. The entire disclosure of U.S. patent application Ser. No. 15/072,975 is hereby incorporated herein by reference.

BACKGROUND

Field of the Invention

The present invention generally relates to a compressor. More specifically, the present invention relates to a compressor with motor cooling.

Background Information

A chiller system is a refrigerating machine or apparatus that removes heat from a medium. Commonly a liquid such as water is used as the medium and the chiller system operates in a vapor-compression refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing, an inlet guide vane, an impeller, a diffuser, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity of refrigerant gas. The diffuser works to transform the velocity of refrigerant gas (dynamic pressure), given by the impeller, into (static) pressure. The motor rotates the impeller. The controller controls the motor, the inlet guide vane and the expansion valve. In this manner, the refrigerant is compressed in a conventional centrifugal compressor. A conventional centrifugal compressor may have one or two stages. A motor drives the one or more impellers.

The motor in the conventional centrifugal compressor may need to be cooled. The general method of motor cooling is by used refrigerant of the chiller system. See for example U.S. Pat. Nos. 3,805,547, 3,645,112, and Japanese publication No. JPH01-138946.

SUMMARY

One example of a relatively common refrigerant used in a centrifugal chiller system is R134a. The conventional motor cooling techniques work relatively well when this refrigerant is used in a conventional chiller system. See FIGS. 25-26. However, it has been discovered that when low pressure refrigerant (LPR), for example R1233zd, is used in a centrifugal chiller system the conventional motor cooling techniques may not be sufficient. See FIGS. 25 and 27.

Therefore an object of the present invention is to provide a centrifugal compressor for a chiller that adequately cools the motor even when LPR is used such as R1233zd.

It has also been discovered that rotor temperature gets higher than stator temperature in a conventional centrifugal chiller system using conventional motor cooling techniques when a low pressure refrigerant (LPR) such as R1233zd is used. See FIG. 27. The temperature of the rotor and/or the stator can also become higher than desired.

Therefore another object of the present invention is to provide a centrifugal compressor for a chiller that adequately cools the rotor and/or stator of the motor even when LPR is used such as R1233zd.

It has further been discovered that an amount of motor cooling depends on refrigerant flow rate, and that too high of refrigerant flow rate in the convention centrifugal compressor can result in drag on the motor.

Therefore another object of the present invention is to provide a centrifugal compressor for a chiller in which adequate refrigerant flow rate is provided without causing drag on the motor.

It has further been discovered that a refrigerant flow rate, and thus, an amount of cooling depends on a pressure difference between higher and lower sides. Pressure difference of R134a is higher than LPR such as R1233zd. However it has been further discovered that the cross sectional area of the flow path is also a factor in the refrigerant flow rate.

Therefore another object of the present invention is to provide a centrifugal compressor for a chiller in which an adequate cross sectional area of a flow path and/or a pressure difference is provided to facilitate adequate refrigerant flow and cooling even when a low pressure refrigerant (LPR) such as R1233zd is used.

It has further been discovered that a low global warming potential (GWP) refrigerant such as R1234ze or R1234yf can also have one or more of the above challenges.

Therefore, yet another object of the present invention is to provide a centrifugal compressor for a chiller in which low global warming potential (GWP) refrigerant such as R1234ze or R1234yf can be used to adequately cool the motor in accordance with one or more of the above objects.

One or more of the foregoing objects can basically be achieved by providing a compressor including a compression mechanism, a shaft rotatable about a rotation axis and attached to the compression mechanism to rotate a part of the compression mechanism, a motor and a cooling medium delivery structure. The motor is arranged to rotate the shaft. The motor includes a rotor mounted on the shaft and a stator disposed radially outwardly of the rotor to form a gap between the rotor and the stator. The cooling medium delivery structure includes an inlet conduit located to supply a cooling medium to the motor and an outlet conduit located to discharge the cooling medium from the motor. The shaft has an external shape different than an internal shape of the rotor to form at least one axial passageway between the shaft and the rotor along an axial length of the shaft at least as long as an axial length of the rotor. The inlet conduit is located to supply the cooling medium through the gap and the at least one axial passageway to cool the rotor. The outlet conduit is located to discharge the cooling medium from the gap and the at least one axial passageway.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
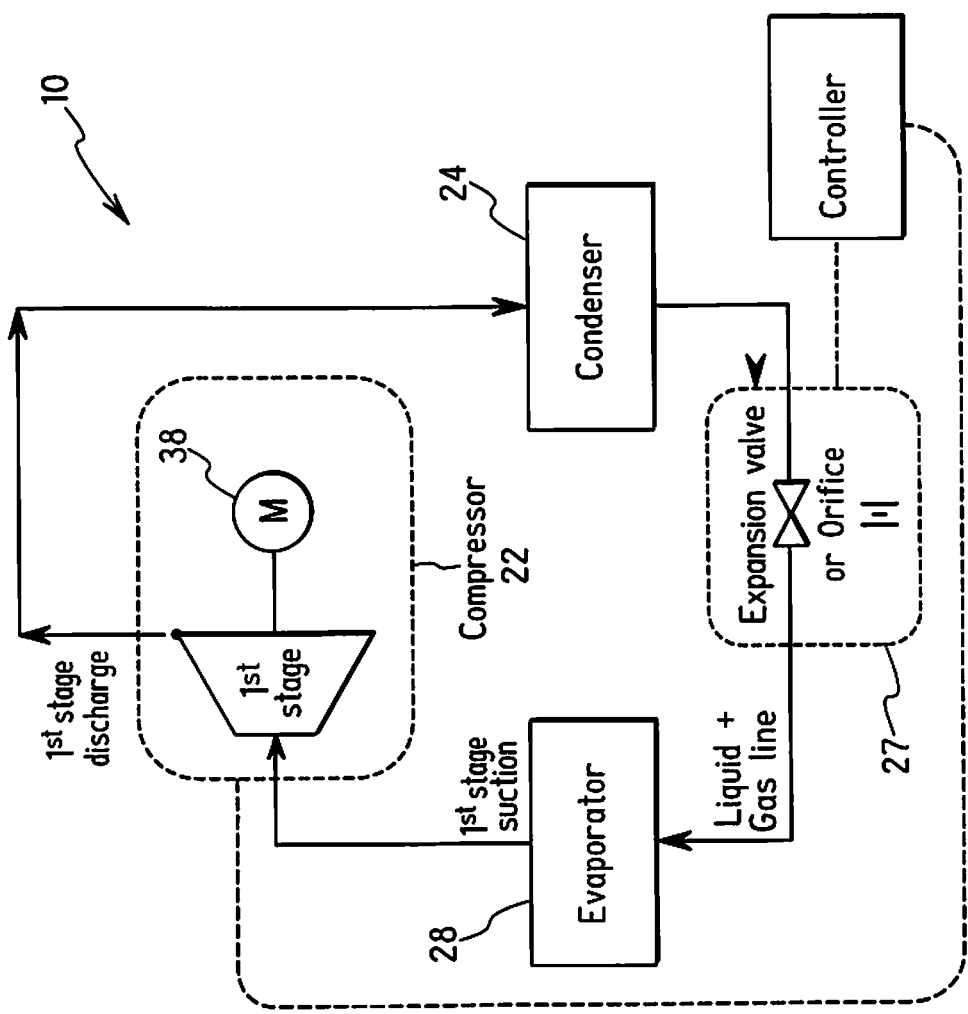
FIG. 1 is a schematic diagram illustrating a single stage chiller system having a centrifugal compressor in accordance with an embodiment of the present invention.
Figure 2:
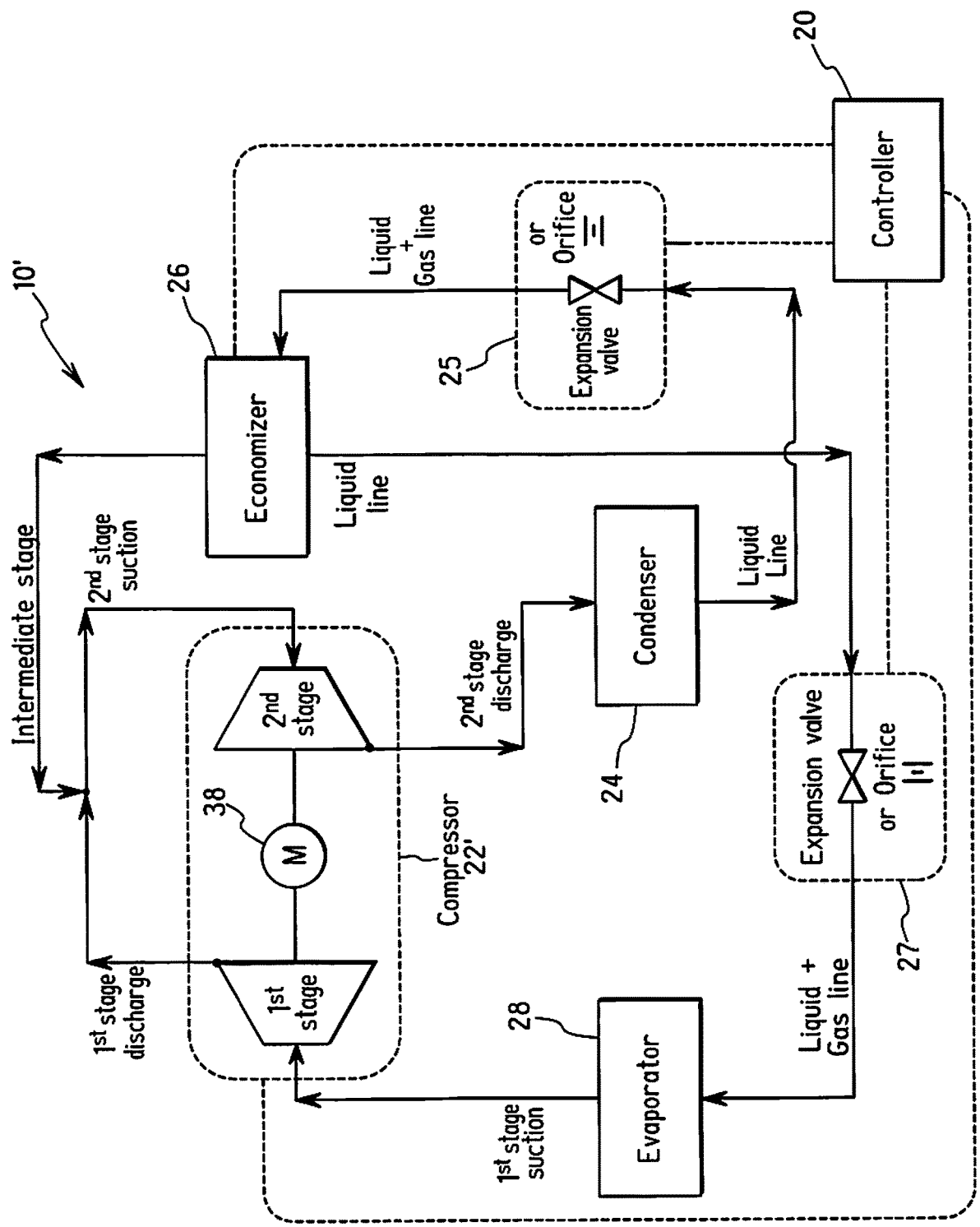
FIG. 2 is a schematic diagram illustrating a two stage chiller system (with an economizer) having a centrifugal compressor in accordance with an embodiment of the present invention.

Referring initially to FIGS. 1 and 2, chiller systems 10 and 10' having centrifugal compressors 22 and 22' in accordance with an embodiment of the present invention are illustrated. The centrifugal compressor 22 of FIG. 1 is a single stage compressor, and thus, the chiller system 10 of FIG. 1 is a single stage chiller system. The centrifugal compressor 22' of FIG. 2 is a two stage compressor, and thus, the chiller system 10' of FIG. 2 is a two stage chiller system. The two stage chiller system of FIG. 2 also includes an economizer. FIGS. 1 and 2 merely illustrate two examples of chiller systems in which centrifugal compressors 22 and 22' in accordance with the present invention can be used.

Referring now briefly to FIGS. 3-13 numerous options for attaching the centrifugal compressors 22 and 22' in the chiller systems 10 and 10' in order to provide motor cooling flow in accordance with the present invention are illustrated. FIGS. 1 and 2 do not illustrate the motor cooling flows shown in FIGS. 3-13 because of the numerous options shown in FIGS. 3-13, if included in FIGS. 1-2, could make FIGS. 1-2 confusing. However, it will be apparent to those skilled in the art from this disclosure that the options of FIGS. 3-13 can be incorporated in the chiller systems 10 and 10' illustrated in FIGS. 1 and 2 as indicated above in the Brief Descriptions of the Drawings. In addition it will be apparent to those skilled in the art from this disclosure that the economizer of the chiller system 10' can be eliminated when not used for motor cooling flow in FIGS. 3-13.

The chiller systems 10 and 10' are conventional, except for the centrifugal compressors 22 and 22' and the manner in which the cooling flows are supplied to the centrifugal compressors 22 and 22'. Therefore the chiller systems 10 and 10' will not be discussed and/or illustrated in detail herein except as related to the centrifugal compressors 22 and 22' and the manner in which the cooling flows are supplied to the centrifugal compressors 22 and 22'. However, it will be apparent to those skilled in the art that the conventional parts of the chiller systems 10 and 10' can be constructed in variety of ways without departing the scope of the present invention. In the illustrated embodiments, the chiller systems 10 and 10' are preferably water chillers that utilize cooling water and chiller water in a conventional manner.

The centrifugal compressors 22 and 22' are identical to each other, except the centrifugal compressor 22' is a two stage compressor. Thus, it will be apparent to those skilled in the art from this disclosure that the singe stage compressor 22 is identical to the centrifugal compressor 22', except for the removal of parts. Therefore, the two stage compressor 22' includes all the parts of the single stage compressor 22, but also includes additional parts. Accordingly, it will be apparent to those skilled in the art from this disclosure that the descriptions and illustrations of the two stage compressor 22' also apply to the single stage compressor 22, except for parts relating to the second stage of compression and modifications related to the second stage of compression (e.g., the housing shape, shaft end shape, etc.). In view of these points, and for the sake of brevity, only the two stage compressor 22' will be explained and/or illustrated in detail herein. The compressor 22' will be explained in more detail below.

Referring again to FIGS. 1-2, the components of the chiller systems 10 and 10' will now briefly be explained. The chiller system 10 basically includes a chiller controller 20, the compressor 22, a condenser 24, an expansion valve or orifice 27, and an evaporator 28 connected together in series to form a loop refrigeration cycle. The chiller system 10' includes a chiller controller 20, the centrifugal compressor 22', a condenser 24, an expansion valve or orifice 25, an economizer 26, an expansion valve or orifice 27, and an evaporator 28 connected together in series to form a loop refrigeration cycle. In either case, various sensors (not shown) are disposed throughout the circuits of the chiller systems 10 and 10' to control the chiller systems 10 and 10' in a conventional manner.

Figure 15:
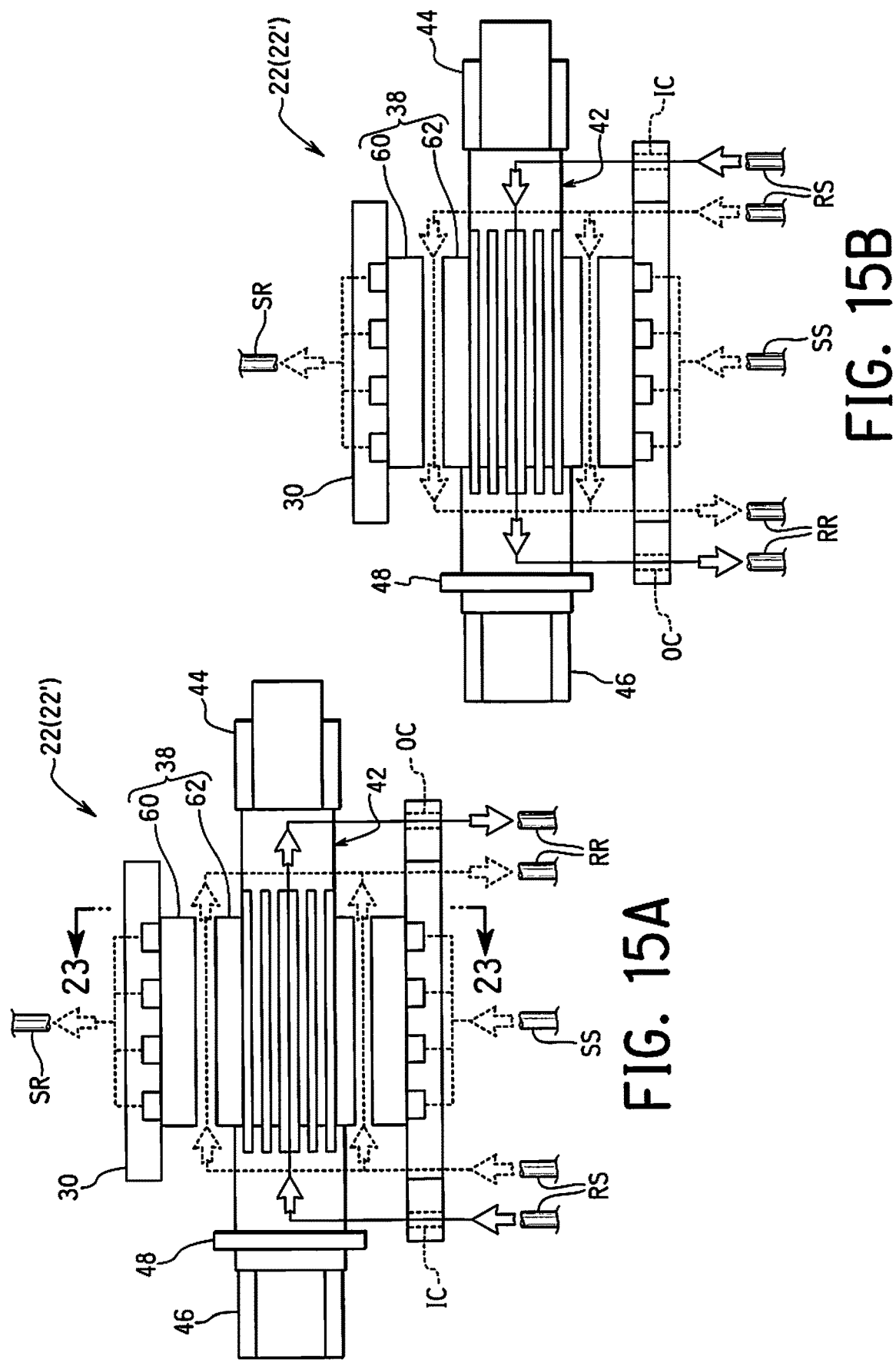
FIG. 15A is a simplified partial longitudinal cross-sectional view of the motor of the compressors illustrated in FIGS. 1-14 illustrating a first parallel directional flow of rotor cooling.
FIG. 15B is a simplified partial longitudinal cross-sectional view of the motor of the compressors illustrated in FIGS. 1-14 illustrating a second parallel directional flow of rotor cooling.

Referring now to FIGS. 1-17, mainly FIGS. 14-17, the compressor 22' will now be explained in more detail. The compressor 22' is a two-stage centrifugal compressor in the illustrated embodiment. Thus, the compressor 22' illustrated herein includes two impellers. However, the compressor 22' include three or more impellers (not shown) or may be a single stage compressor as shown in FIG. 1. The two-stage centrifugal compressor 22' of the illustrated embodiment is conventional except that the compressor 22' includes motor cooling paths connected to the compressor 22' as shown in one of FIGS. 3-13, and cooling refrigerant supplied within the compressor 22' as shown in FIGS. 15A-15B. Of course, it will be apparent to those skilled in the art from this disclosure that the cooling paths of FIGS. 16A-16B could also be used without departing from the scope of the present invention. The motor cooling will be explained in more detail below.

Thus, the centrifugal compressor 22' includes a first stage impeller 34a and a second stage impeller 34b. The centrifugal compressor 22' further includes a first stage inlet guide vane 32a, a first diffuser/volute 36a, a second stage inlet guide vane 32b, a second diffuser/volute 36b, a compressor motor 38, and a magnetic bearing assembly 40 as well as various conventional sensors (only some shown). While magnetic bearings are described herein, it will be apparent to those skilled in the art from this disclosure that other types and forms of compressor bearings may be used with this invention. A casing 30 covers the other parts of the centrifugal compressor 22'. The casing 30 includes an inlet portion 31a and an outlet portion 33a for the first stage of the compressor 22'. The casing 30 also includes an inlet portion 31b and an outlet portion 33b for the second stage of the compressor 22'. The casing 30, the first stage inlet guide vane 32a, the first stage impeller 34a, and the first diffuser/volute 36a form parts of a first compression mechanism. Likewise, the casing 30, the second stage inlet guide vane 32b, the second stage impeller 34b, and the second diffuser/volute 36b form parts of a second compression mechanism.

The chiller controller 20 receives signals from the various sensors and controls the inlet guide vanes 32a and 32b, the compressor motor 38, and the magnetic bearing assembly 40 in a conventional manner, as explained in more detail below. Refrigerant flows in order through the first stage inlet guide vane 32a, the first stage impeller 34a, the second stage inlet guide vane 32b, and the second stage impeller 34b. The inlet guide vanes 32a and 32b control the flow rate of refrigerant gas into the impellers 34a and 34b, respectively, in a conventional manner. The impellers 34a and 34b increase the velocity of refrigerant gas, generally without changing pressure. The motor speed determines the amount of increase of the velocity of refrigerant gas. The diffusers/volutes 36a and 36b increase the refrigerant pressure. The diffusers/volutes 36a and 36b are non-movably fixed relative to the casing 30. The compressor motor 38 rotates the impellers 34a and 34b via a shaft 42. The magnetic bearing assembly 40 magnetically supports the shaft 42. Alternatively, the bearing system may include a roller element, a hydrodynamic bearing, a hydrostatic bearing, and/or a magnetic bearing, or any combination of these. In this manner, the refrigerant is compressed in the centrifugal compressor 22'.

In operation of the chiller system 10, the first stage impeller 34a and the second stage impeller 34b of the compressor 22' are rotated, and the refrigerant of low pressure in the chiller system 10 is sucked by the first stage impeller 34a. The flow rate of the refrigerant is adjusted by the inlet guide vane 32a. The refrigerant sucked by the first stage impeller 34a is compressed to intermediate pressure, the refrigerant pressure is increased by the first diffuser/volute 36a, and the refrigerant is then introduced to the second stage impeller 34b. The flow rate of the refrigerant is adjusted by the inlet guide vane 32b. The second stage impeller 34b compresses the refrigerant of intermediate pressure to high pressure, and the refrigerant pressure is increased by the second diffuser/volute 36b. The high pressure gas refrigerant is then discharged to the chiller system 10.

Referring to FIGS. 14-17, the magnetic bearing assembly 40 is conventional, and thus, will not be discussed and/or illustrated in detail herein, except as related to the present invention. Rather, it will be apparent to those skilled in the art that any suitable magnetic bearing can be used without departing from the present invention. The magnetic bearing assembly 40 preferably includes a first radial magnetic bearing 44, a second radial magnetic bearing 46 and an axial (thrust) magnetic bearing 48. In any case, at least one radial magnetic bearing 44 or 46 rotatably supports the shaft 42. The thrust magnetic bearing 48 supports the shaft 42 along a rotational axis X by acting on a thrust disk 45. The thrust magnetic bearing 48 includes the thrust disk 45 which is attached to the shaft 42.

The thrust disk 45 extends radially from the shaft 42 in a direction perpendicular to the rotational axis X, and is fixed relative to the shaft 42. A position of the shaft 42 along rotational axis X (an axial position) is controlled by an axial position of the thrust disk 45. The first and second radial magnetic bearings 44 and 46 are disposed on opposite axial ends of the compressor motor 38. Various sensors detect radial and axial positions of the shaft 42 relative to the magnetic bearings 44, 46 and 48, and send signals to the chiller controller 20 in a conventional manner. The chiller controller 20 then controls the electrical current sent to the magnetic bearings 44, 46 and 48 in a conventional manner to maintain the shaft 42 in the correct position. The magnetic bearing assembly 40 is preferably a combination of active magnetic bearings 44, 46, and 48, which utilizes gap sensors 54, 56 and 58 to monitor shaft position and send signals indicative of shaft position to the chiller controller 20. Thus, each of the magnetic bearings 44, 46 and 48 are preferably active magnetic bearings.

Referring now to FIGS. 14-24, the motor 38 in accordance with the present invention will now be explained in more detail. The motor 38 includes a stator 60 and a rotor 62. The stator 60 is fixed to an interior surface of the casing 30. On the other hand, the rotor 62 is fixed to the shaft 42. The stator 60 and the rotor 62 are conventional. Thus, when electricity is sent to the stator 60, the rotor 62 is caused to rotate. Since the rotor is fixed to the shaft 42, the shaft 42 is also caused to rotate, and thus, the impellers 34a and 34b are also cause to rotate. A gap G is formed between the stator 60 and the rotor 62. The gap G extends circumferentially completely around the rotor 62 and axially along the lengths of the stator 60 and rotor 62. Cooling fluid is supplied to the outside of the stator 60. In addition, cooling fluid is supplied to an axial end of the motor 38 to cool the rotor 62 by passing axially through the gap G. Cooling of the stator 60 and the rotor 62 will be explained in more detail below.

Figure 17:
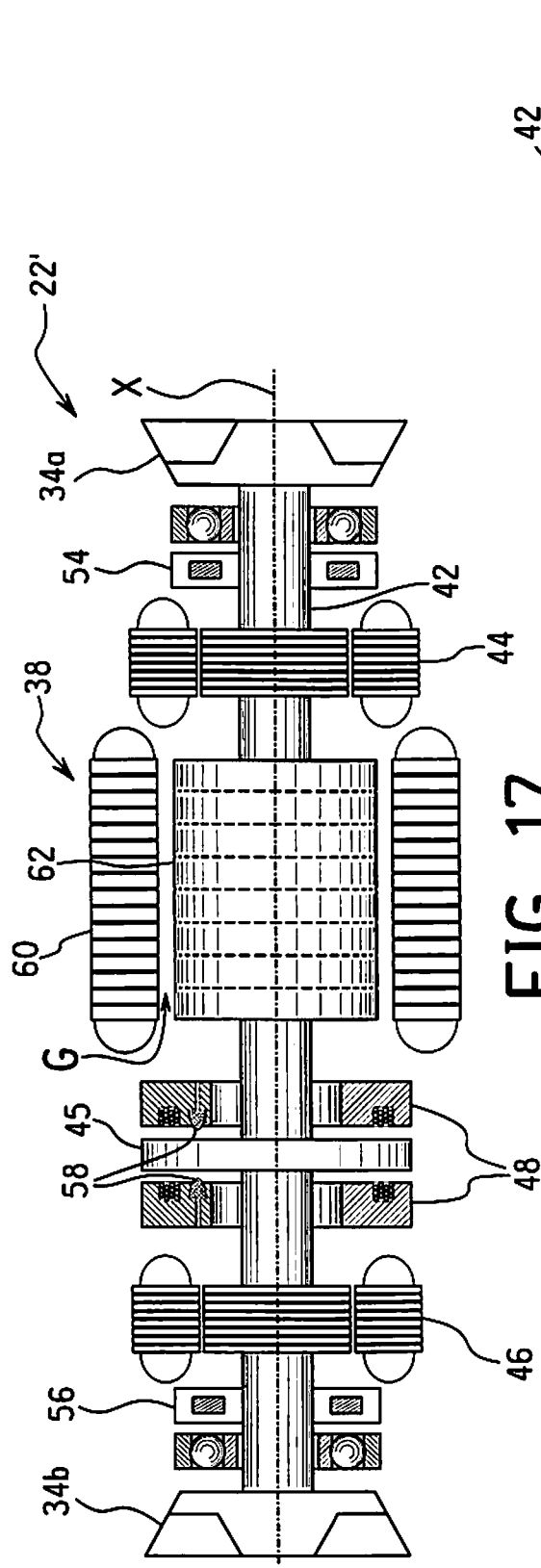
FIG. 17 is a schematic longitudinal cross-sectional view of the impellers, motor and magnetic bearings of the centrifugal compressor illustrated in FIGS. 1-16, with cooling medium flow omitted for the sake of simplicity.
Figure 18:
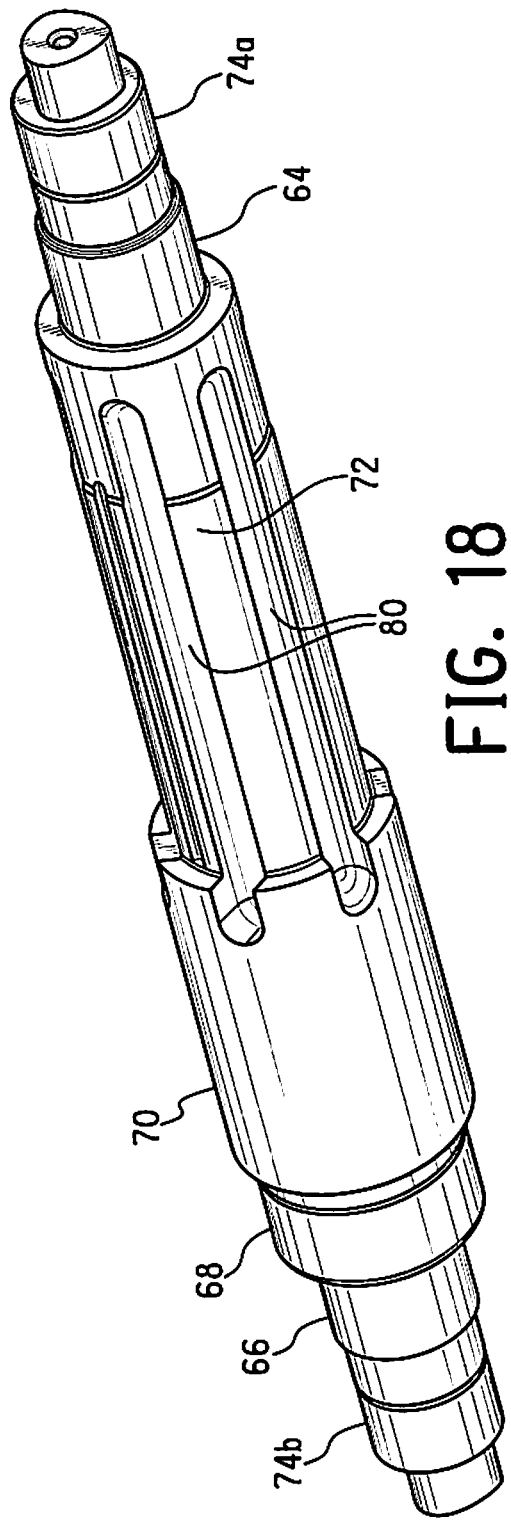
FIG. 18 is an enlarged perspective view of the motor shaft of the motor of the compressors illustrated in FIGS. 1-17.
Figure 19:
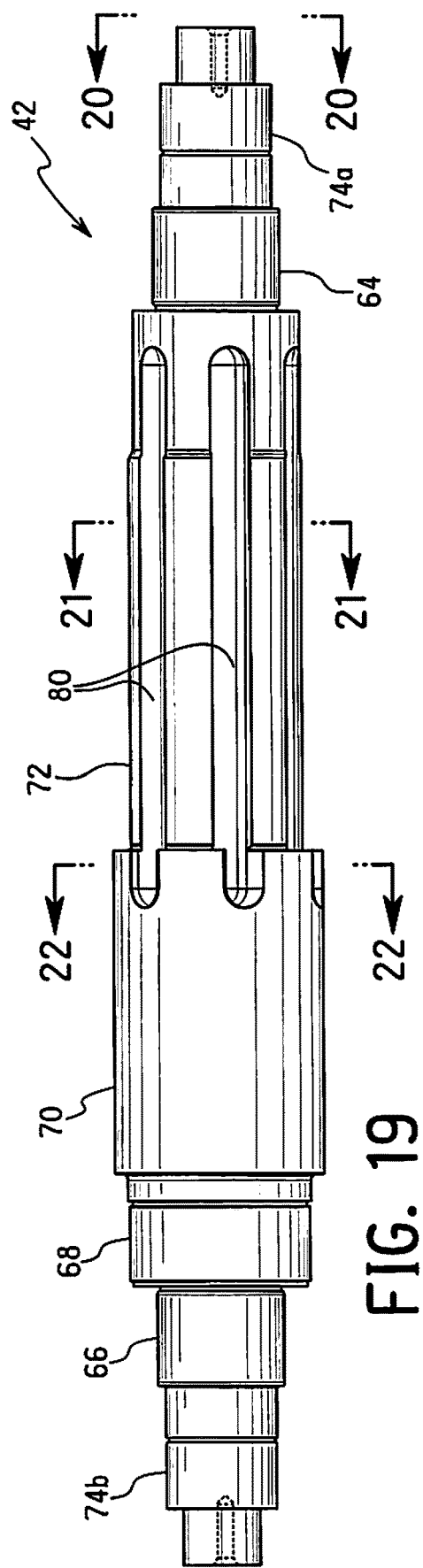
FIG. 19 is a longitudinal elevational view of the motor shaft illustrated in FIG. 18.
Figure 22:
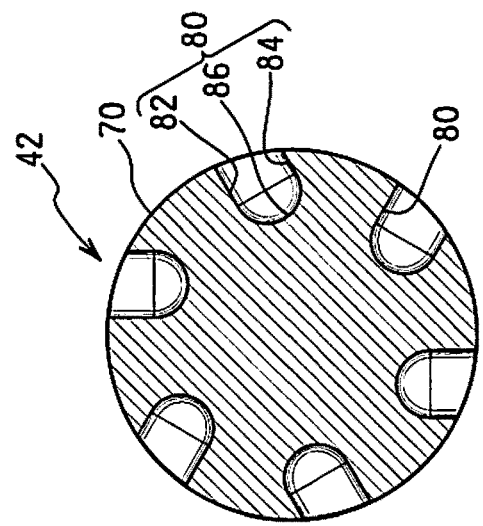
FIG. 22 is a transverse cross-sectional view of the motor shaft illustrated in FIGS. 18-20 as viewed along section line 22-22 of FIG. 19.
Figure 21:
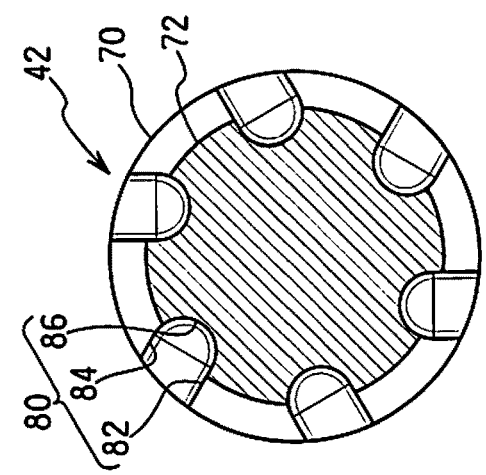
FIG. 21 is a transverse cross-sectional view of the motor shaft illustrated in FIGS. 18-20 as viewed along section line 21-21 of FIG. 19.
Figure 20:
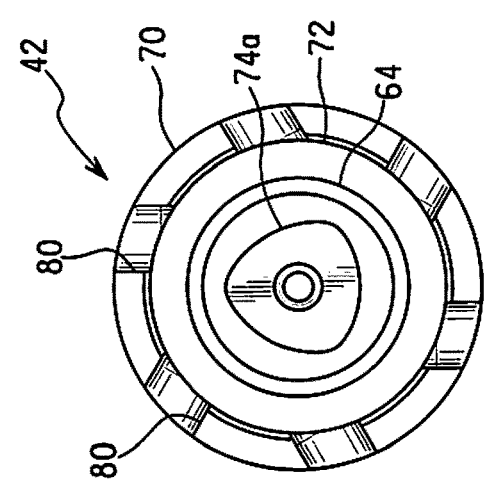
FIG. 20 is an end elevational view of the motor shaft illustrated in FIGS. 18-19.

Referring to FIGS. 18-24, the shaft 42 will now be explained in more detail. It should be noted that FIG. 17 is a simplified view, and thus, does not illustrate the portions of the shaft 42. As mentioned above, the rotor 62 is mounted on the shaft 42. The shaft 42 includes a first radial magnetic bearing portion 64, a second radial magnetic bearing portion 66, a third axial magnetic bearing support portion 68, an enlarged (first) portion 70 and a rotor support (second) portion 72. In addition, impeller support portions 74a and 74b are disposed at opposite ends of the shaft 42 and have the impellers 34a and 34b fixedly attached thereto.

The first radial magnetic bearing portion 64 is axially disposed between the rotor support portion 72 and impeller support portion 34a. The first radial magnetic bearing portion 64 is magnetically radially supported by the first radial magnetic bearing 44 in a conventional manner. The third axial magnetic bearing support portion 68 is axially disposed between the enlarged portion 70 and second magnetic bearing portion 66. The third axial magnetic bearing support portion 68 has the thrust disk 45 fixedly mounted thereon in a conventional manner (not shown in FIGS. 18-24). The thrust disk 45 is axially magnetically supported by the axial magnetic bearing 48 in a conventional manner. The second magnetic bearing portion 66 is axially disposed between the third axial magnetic bearing support portion 68 and the second impeller support portion 74b. The second radial magnetic bearing portion 66 is magnetically radially supported by the second radial magnetic bearing 46 in a conventional manner.

Figure 16:
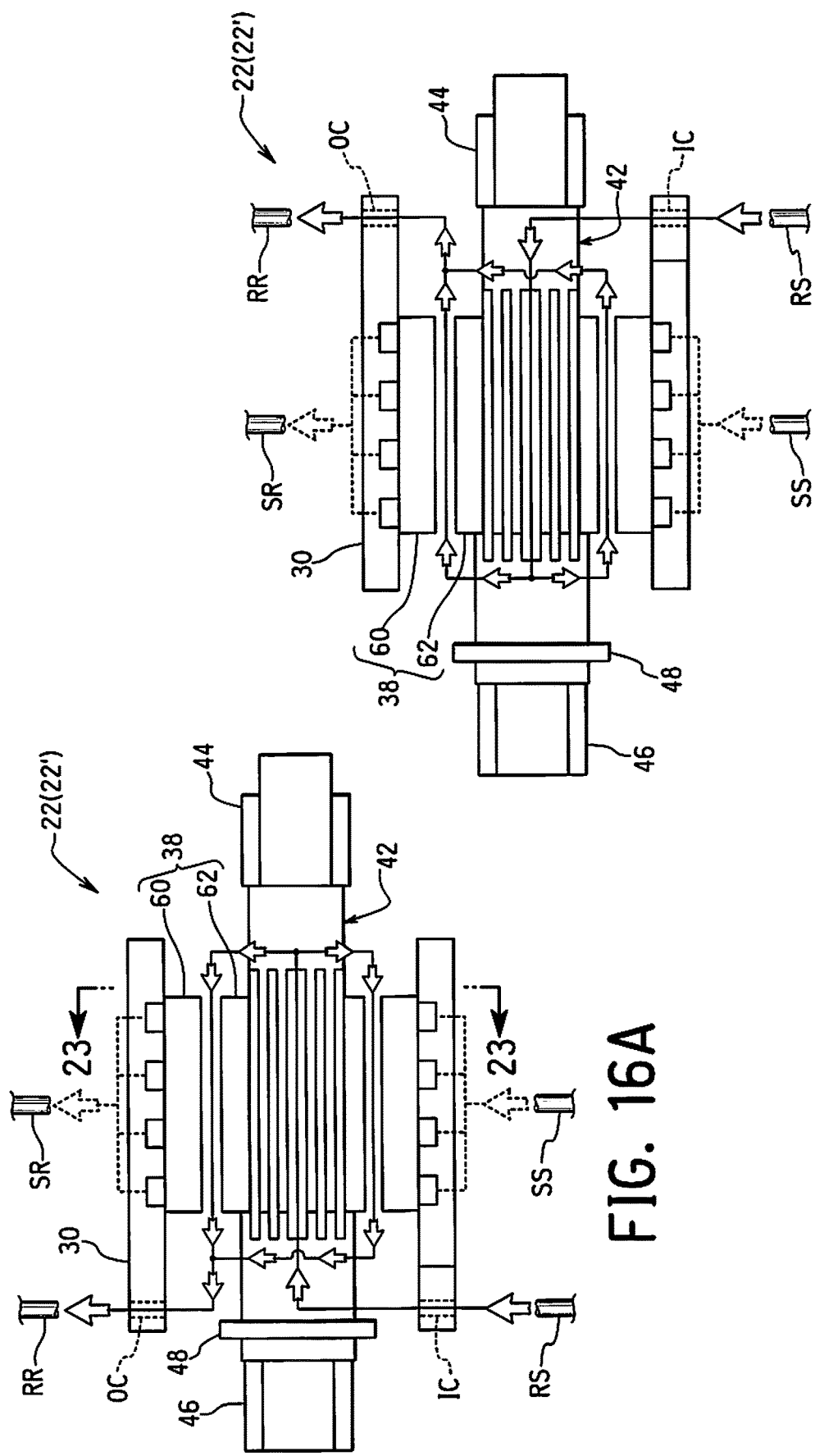
FIG. 16A is a simplified partial longitudinal cross-sectional view of the motor of the compressors illustrated in FIGS. 1-14 illustrating a first series directional flow of rotor cooling.
FIG. 16B is a simplified partial longitudinal cross-sectional view of the motor of the compressors illustrated in FIGS. 1-14 illustrating a second series directional flow of rotor cooling.

The rotor support portion 72 is axially disposed between the first magnetic bearing portion 64 and the enlarged portion 70. The enlarged portion 70 is axially disposed between the rotor support portion 72 and the third axial magnetic bearing support portion 68. A plurality of grooves 80 are formed in the outside surface of portions of the enlarged portion 70 and the rotor support portion 72. Due to the presence of the grooves 80, the shaft 42 has an external shape different from an internal shape of the rotor 62 to form a plurality of axial passageways. Due to the enlarged portion 70 being larger than the rotor support portion 72, the rotor 62 can be slid onto the rotor support portion 72 until the rotor 62 contacts the enlarged portion 70. See FIGS. 14-16. However the grooves 80 have lengths longer than the rotor 62 and extend along part of the enlarged portion 70 and the rotor support portion 72. In addition, the grooves 80 have depths larger than the difference in radial height between the enlarged portion 70 and the rotor support portion 72, as best understood from FIGS. 18 and 21. Thus, cooling fluid can pass axially through the grooves 80, as explained in more detail below. The cooling fluid can pass in parallel as shown in FIG. 15A from left to right, or in parallel as shown in FIG. 15B from right to left. Alternatively, the cooling medium can pass in series *e.g., a counter flow) as shown in FIG. 16A to/from the left, or in series as shown in FIG. 16B to/from the right. The flows of FIGS. 16A and 16B can be particularly useful when there is a large pressure difference between the supply side and the return side.

Referring still to FIGS. 18-24 the grooves 80 of the shaft 42 will now be explained in more detail. In the illustrated embodiment, the shaft 42 has six grooves 80 equally circumferentially spaced from each other. Thus, the external shape of the shaft 42 includes an annular section (of each of the enlarged portion 70 and rotor support portion 72) and a plurality of grooves 80 extending radially inwardly from the annular sections. In addition, in the illustrated embodiment, the grooves 80 are identical to each other. Each groove 80 includes a first sidewall 82, a second sidewall 84 circumferentially spaced from the first sidewall 82 and a trough wall 86 connecting radially inner ends of the first and second sidewalls 82 and 84. The first sidewall 82 of each groove 80 is substantially parallel to the second sidewall 84 of the groove 80 as viewed in axial cross section. In addition, each groove 80 has a centerline C equally spaced from the first and second sidewalls 82 and 84 as viewed in axial cross section, and the centerline C of each groove 80 is inclined relative to a radial direction of the shaft 42 as best understood from FIGS. 23 and 24.

In view of the above configuration, the external shape of the shaft 42 is different than the internal shape of the rotor 62 to form a plurality of axial passageways between the shaft 42 and the rotor 62 along the axial length of the shaft 42 at least as long as the axial length of the rotor 62. In any event, the shaft 42 has an external shape different than an internal shape of the rotor 62 to form at least one axial passageway between the shaft 42 and the rotor 62 along an axial length of the shaft 42 at least as long as an axial length of the rotor 62. When discussed the axial length of the rotor 62 here it is intended to refer to an axial length of the portion of the rotor 62 attached to the shaft 42. A total cross sectional area of the at least one axial passageway is larger than a total cross sectional area of the gap G as viewed in axial cross section. Preferably, the total cross sectional area of the at least one axial passageway is approximately double the total cross sectional area of the gap G as viewed in axial cross section.

Figure 23:
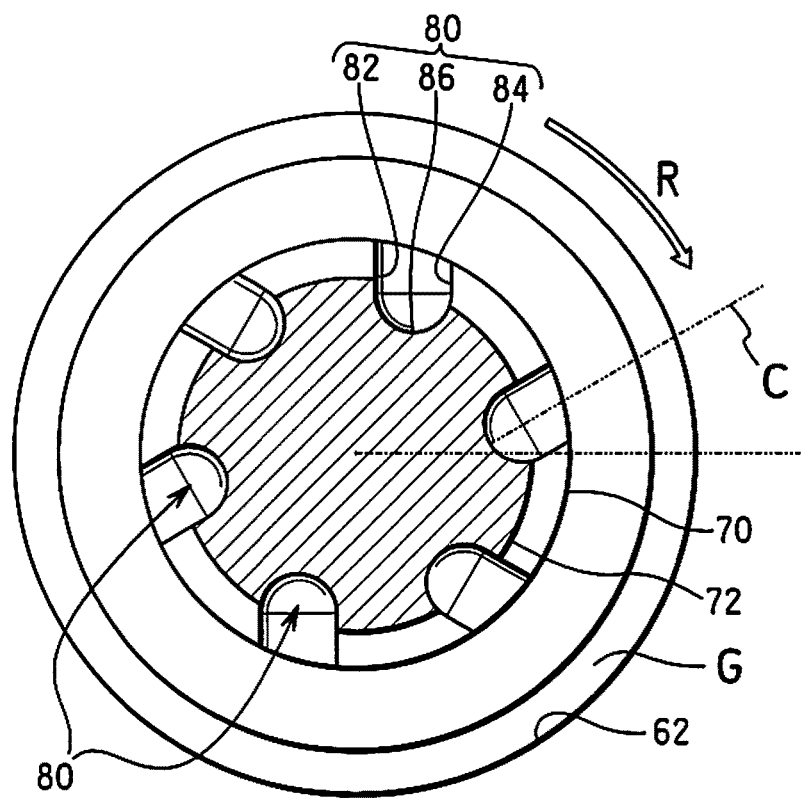
FIG. 23 is a partial transverse cross-section view of the motor of the compressor illustrated In FIGS. 15A-15B, as seen along section line 23-23 of FIG. 15A, illustrating a negative angle of the grooves in the shaft relative to the rotation direction.
Figure 24:
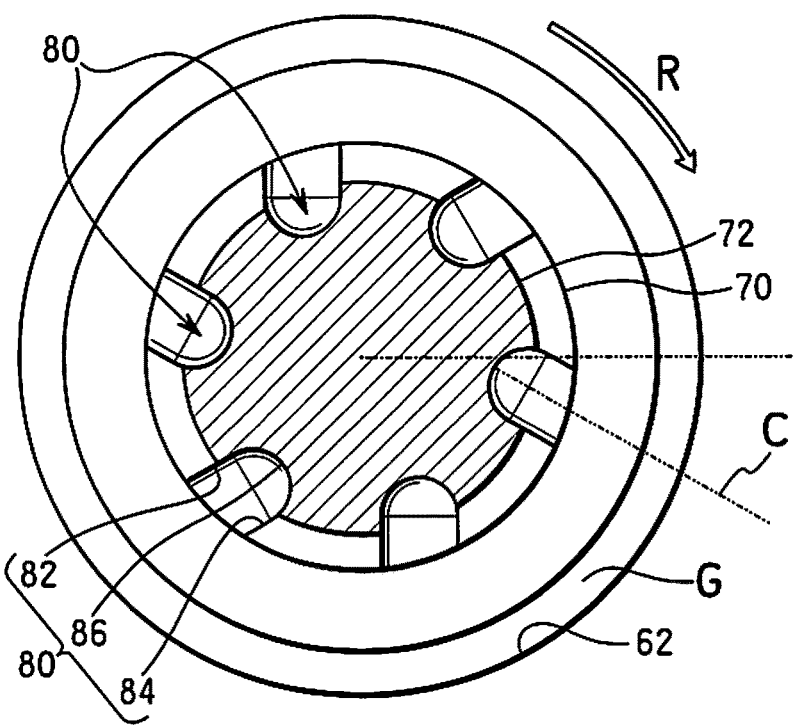
FIG. 24 is a partial transverse cross-section view of the motor of the compressor illustrated In FIGS. 15A-15B, as seen along section line 23-23 of FIG. 15A, illustrating a positive angle of the grooves in the shaft relative to the rotation direction.
Figure 25:
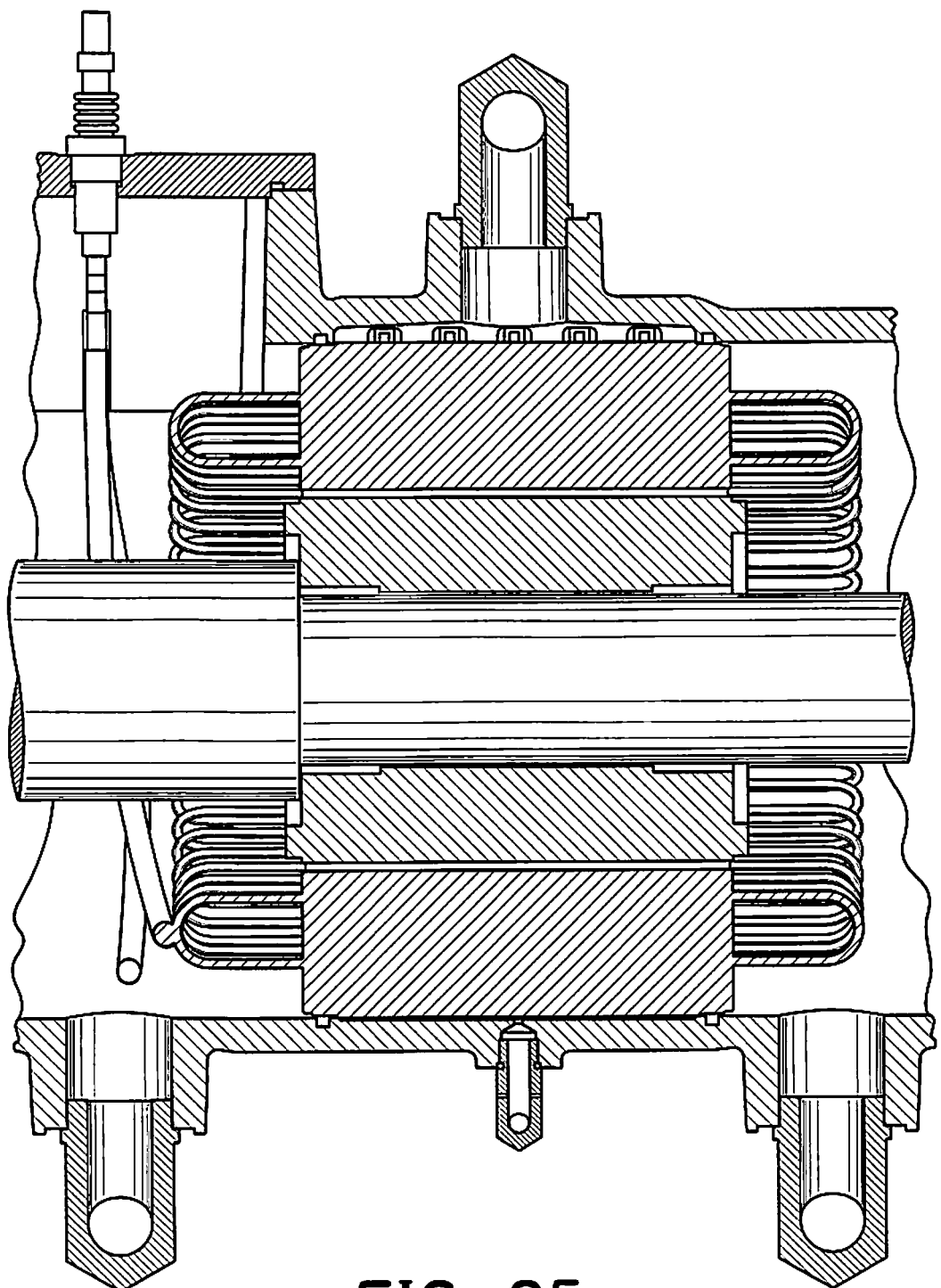
FIG. 25 is partial cross-sectional view of the centrifugal compressor having a conventional motor.

The shaft 42 rotates in a rotation direction R during operation of the centrifugal compressor 22 or 22', and each centerline C may be inclined so that a radially inner end is disposed circumferentially further in the positive rotational direction than a radially outer end of the centerline C as shown in FIG. 23. This illustrates a negative angle of the grooves 80. Alternatively, the shaft 42 rotates in a rotation direction R during operation of the centrifugal compressor 22 or 22', and each centerline C may be inclined so that a radially outer end is disposed circumferentially further in the positive rotational direction than a radially inner end of the centerline C as shown in FIG. 24. This illustrates a positive angle of the grooves.

The groove configurations of the illustrated embodiment are merely examples. However, it will be apparent to those skilled in the art from this disclosure that the exact groove configuration may be calculated based on fluid simulation, the characteristics of the groove. However, it is preferable that there is an angle with respect to the rotational direction. The direction of such an angle can be determined as follows. When designed with an emphasis on cooling, a "negative angle" with respect to the rotational direction as shown in FIG. 23 may be most useful, while when designed with an emphasis on friction loss, a "positive angle" with respect to the rotational direction, because the rotational resistance (friction loss) of the shaft increases in the case of the "positive angle" with respect to the rotational direction as shown in FIG. 24 may be the most useful.

In either case, it is preferable that the total area of the shaft grooves 80 is approximately double the passage area of the air gap G. Thus, a total cross sectional area of the plurality of grooves 80 is larger than a total cross sectional area of the gap G as viewed in axial cross section. Preferably, the total cross sectional area of the plurality of grooves 80 is approximately double the total cross sectional area of the gap G as viewed in axial cross section. In the illustrated embodiment a ratio of the grooves 80 area to the gap G area is 0.63 to 0.37. However, the optimum groove area as well as the groove angle is preferably determined in accordance with whether designed with an emphasis on cooling or on decreasing friction loss. In discussing the cross-section areas herein it should be noted that the gap G is typically very small so that its size is enlarged herein for the sake of illustration.

Referring again to FIGS. 3-13, the options for cooling medium delivery to the motor 38 will be explained in more detail. In all of FIGS. 3-13 there is provided a stator supply SS, a stator return SR, at least one rotor supply RS and a rotor return RR. While only illustrated as lines in these figures, these lines represent conventional conduits/piping as best understood from FIGS. 15A-15B and 16A-16B. The RR and RS lines in FIGS. 15A-15B may be combined only at the solid lines. In other words a single rotor supply line RS and a single Rotor return line RR can be provided in FIGS. 15A-15B or two parallel lines may be provided. In either case, FIGS. 15A-15B illustrated parallel flow through the gap G and the grooves 80. In FIGS. 16A-16B, series flow through the grooves 80 and the gap G is illustrated to/from opposite ends of the motor 38. Thus, only a single rotor supply line RS and a single rotor return line RR is used. It will be apparent to those skilled in the art from this disclosure that at least any of the flows of FIGS. 15A, 15B, 16A, 16B can be used with the flows of FIGS. 3-13 without departing from the scope of the present invention.

In FIGS. 3-13, the stator supply lines SS and stator return lines SR are the same for all of FIGS. 3-13. Each stator supply line SS includes two solenoid valves SOV sandwiching a dryer filter DF therebetween. Each stator return line SR includes a solenoid valve SOV. In addition, the rotor return line RR for each of FIGS. 3-13 is also the same. However, the rotor supply lines RS for FIGS. 3-13 are different. In FIGS. 3-13, some of the cooling medium delivery arrangements apply to the first and/or second chiller systems 10 or 10' in which case the second stage of the compressor 22' is surrounded by hidden lines, to indicate that it is optional. In these cases, the rotor supply line RS is not impacted by the presence or absence of the second stage of the compressor 22'

Figure 3:
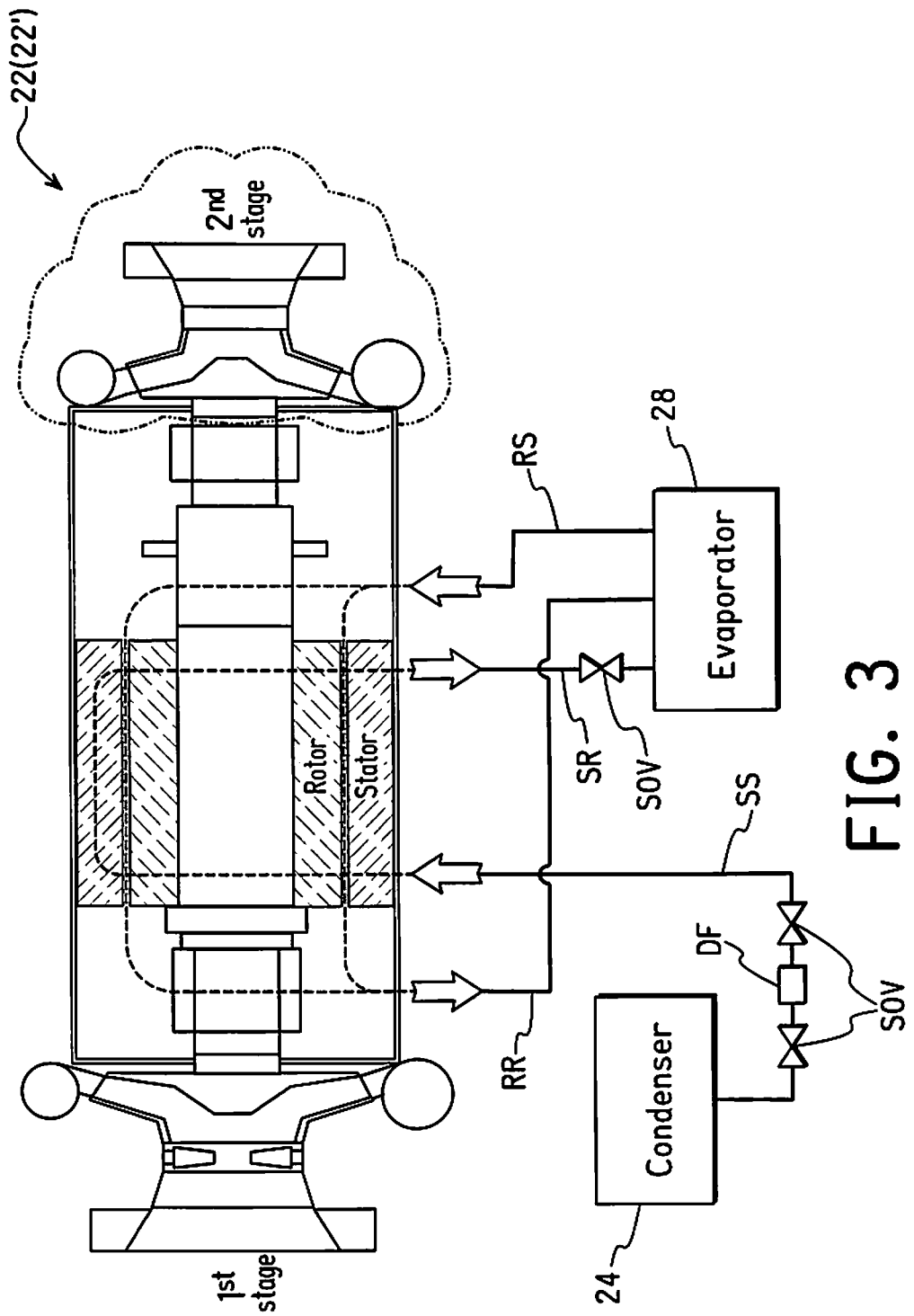
FIG. 3 is partial schematic diagram illustrating a first option of stator and rotor cooling flow paths applicable to the chiller systems of FIGS. 1 and 2, with the second stage shown in a phantom circle to illustrate that the second stage is only present in FIG. 2.

In FIG. 3 the rotor supply line RS delivers cooling fluid from the evaporator 28 to the motor 38. Thus, this delivery applies to the single stage chiller 10 or the two stage chiller system 10'.

Figure 4:
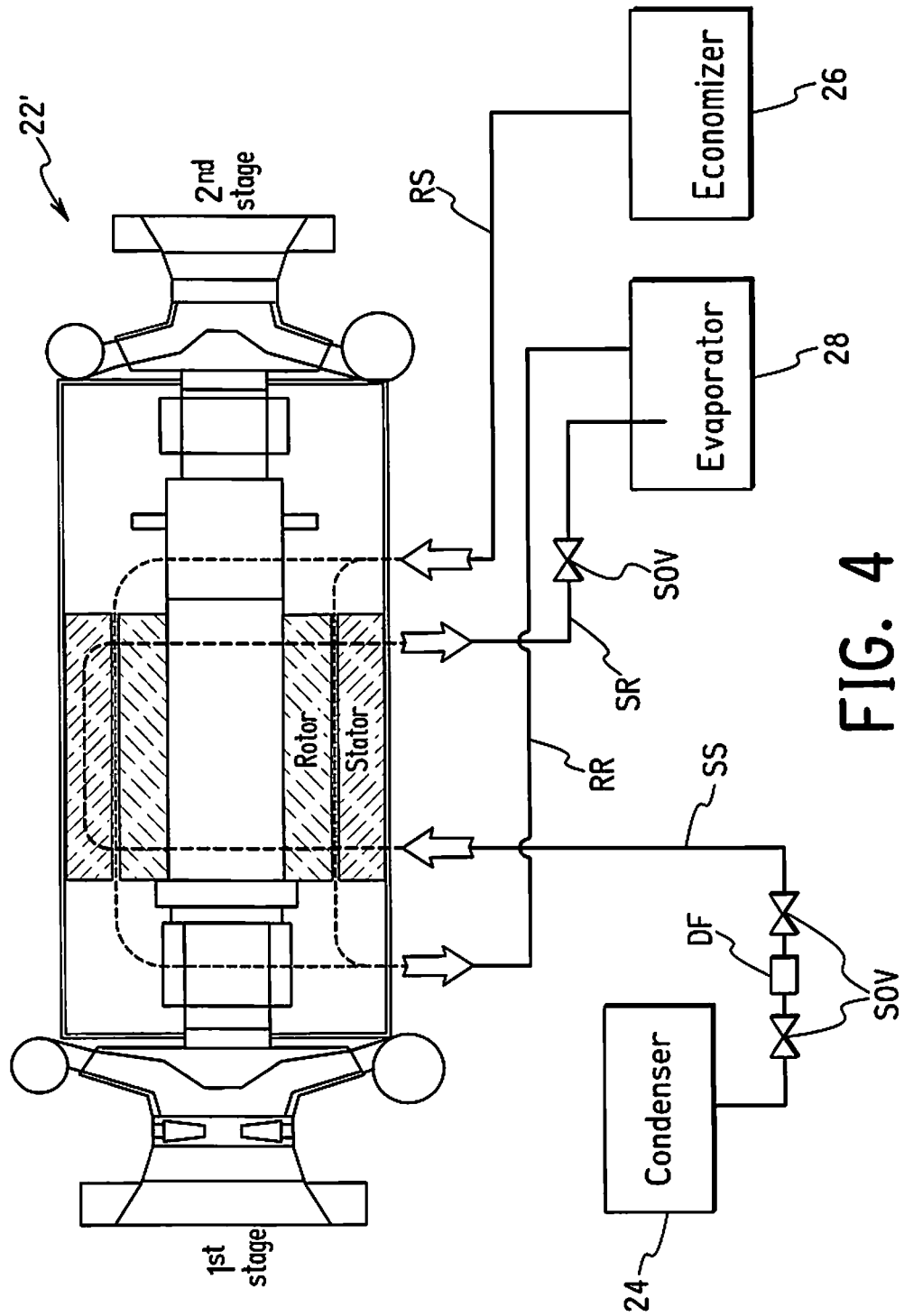
FIG. 4 is partial schematic diagram illustrating a second option of stator and rotor cooling flow paths applicable to the chiller system of FIG. 2.

In FIG. 4 the rotor supply line RS delivers cooling fluid from the economizer 26 to the motor 38. Thus, this delivery applies to the two stage chiller system 10'.

Figure 5:
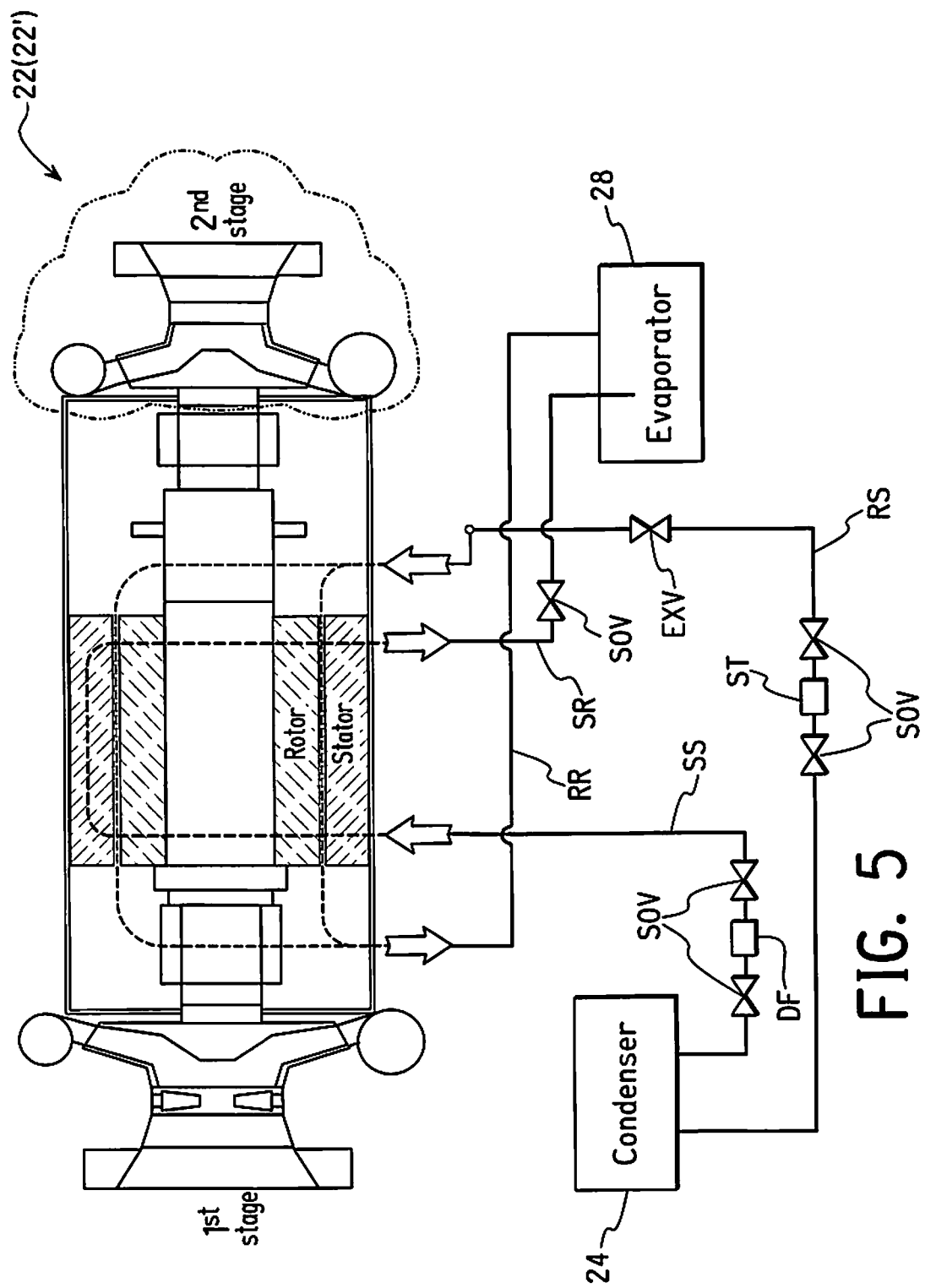
FIG. 5 is partial schematic diagram illustrating a third option of stator and rotor cooling flow paths applicable to the chiller systems of FIGS. 1 and 2, with the second stage shown in a phantom circle to illustrate that the second stage is only present in FIG. 2.

In FIG. 5 the rotor supply line RS delivers cooling fluid from the condenser 24 to the motor 38. In this option, the rotor supply line RS includes solenoid valves SOV sandwiching a strainer ST therebetween, and with an expansion valve EXV downstream. Thus, this delivery applies to the single stage chiller 10 or the two stage chiller system 10'.

Figure 6:
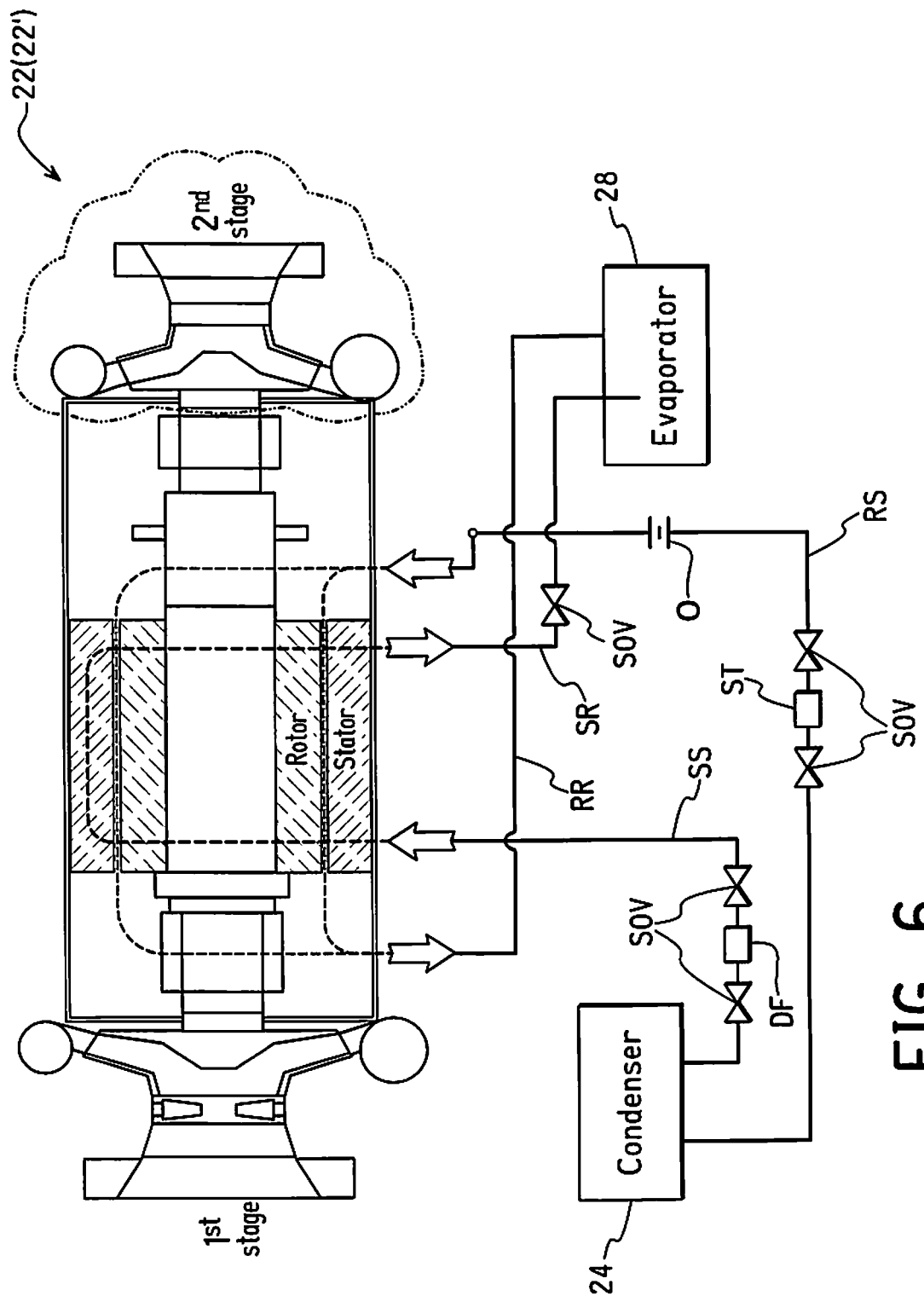
FIG. 6 is partial schematic diagram illustrating a fourth option of stator and rotor cooling flow paths applicable to the chiller systems of FIGS. 1 and 2, with the second stage shown in a phantom circle to illustrate that the second stage is only present in FIG. 2.

In FIG. 6 the rotor supply line RS delivers cooling fluid from the condenser 24 to the motor 38. In this option, the rotor supply line RS includes solenoid valves SOV sandwiching a strainer ST therebetween, and with an Orifice O downstream. Thus, this delivery applies to the single stage chiller 10 or the two stage chiller system 10'.

Figure 7:
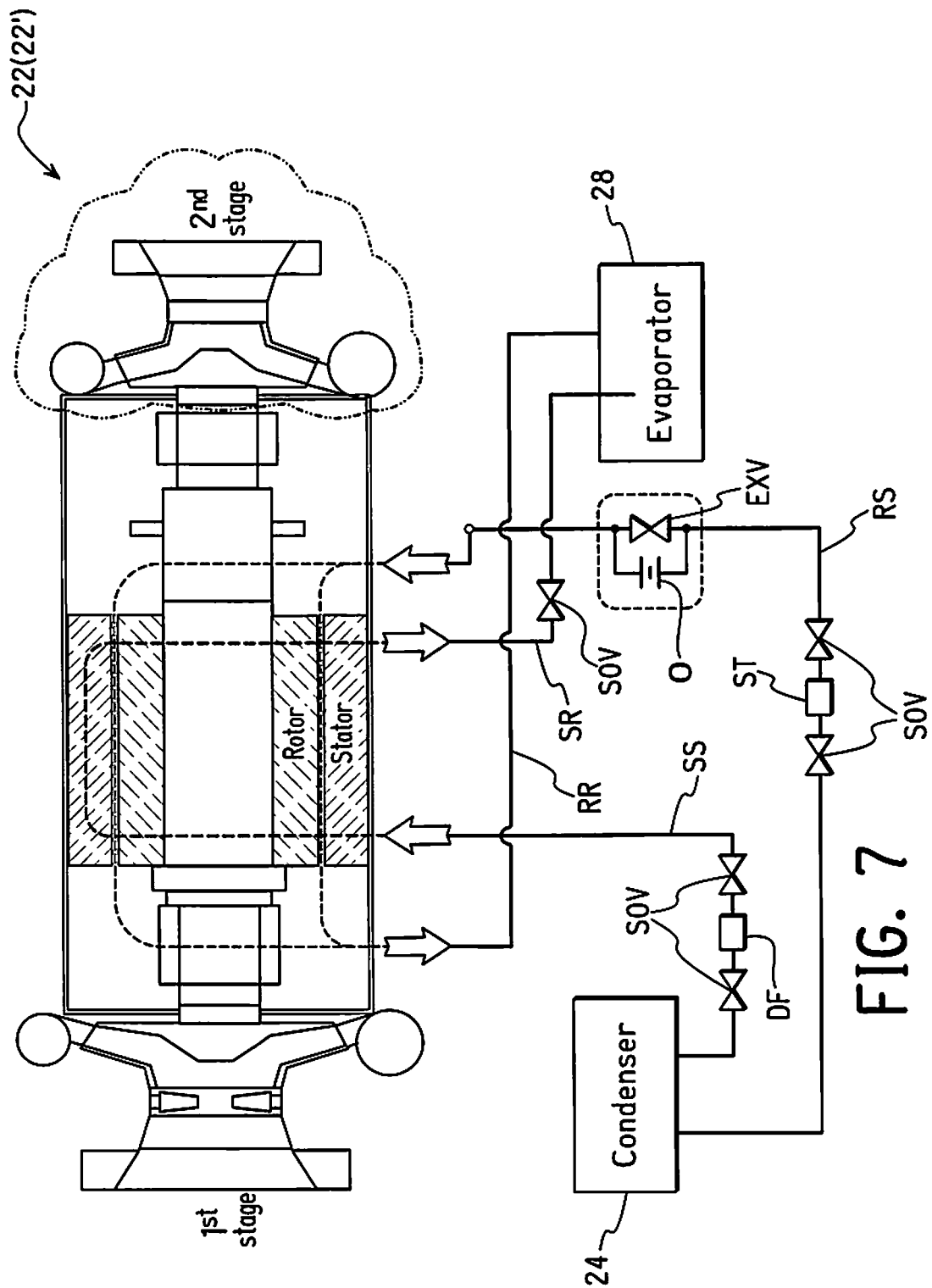
FIG. 7 is partial schematic diagram illustrating a fifth option of stator and rotor cooling flow paths applicable to the chiller systems of FIGS. 1 and 2, with the second stage shown in a phantom circle to illustrate that the second stage is only present in FIG. 2.

In FIG. 7 the rotor supply line RS delivers cooling fluid from the condenser 24 to the motor 38. In this option, the rotor supply line RS includes solenoid valves SOV sandwiching a strainer ST therebetween, and with parallel mounted expansion valve EXV and orifice O downstream. Thus, this delivery applies to the single stage chiller 10 or the two stage chiller system 10'.

Figure 8:
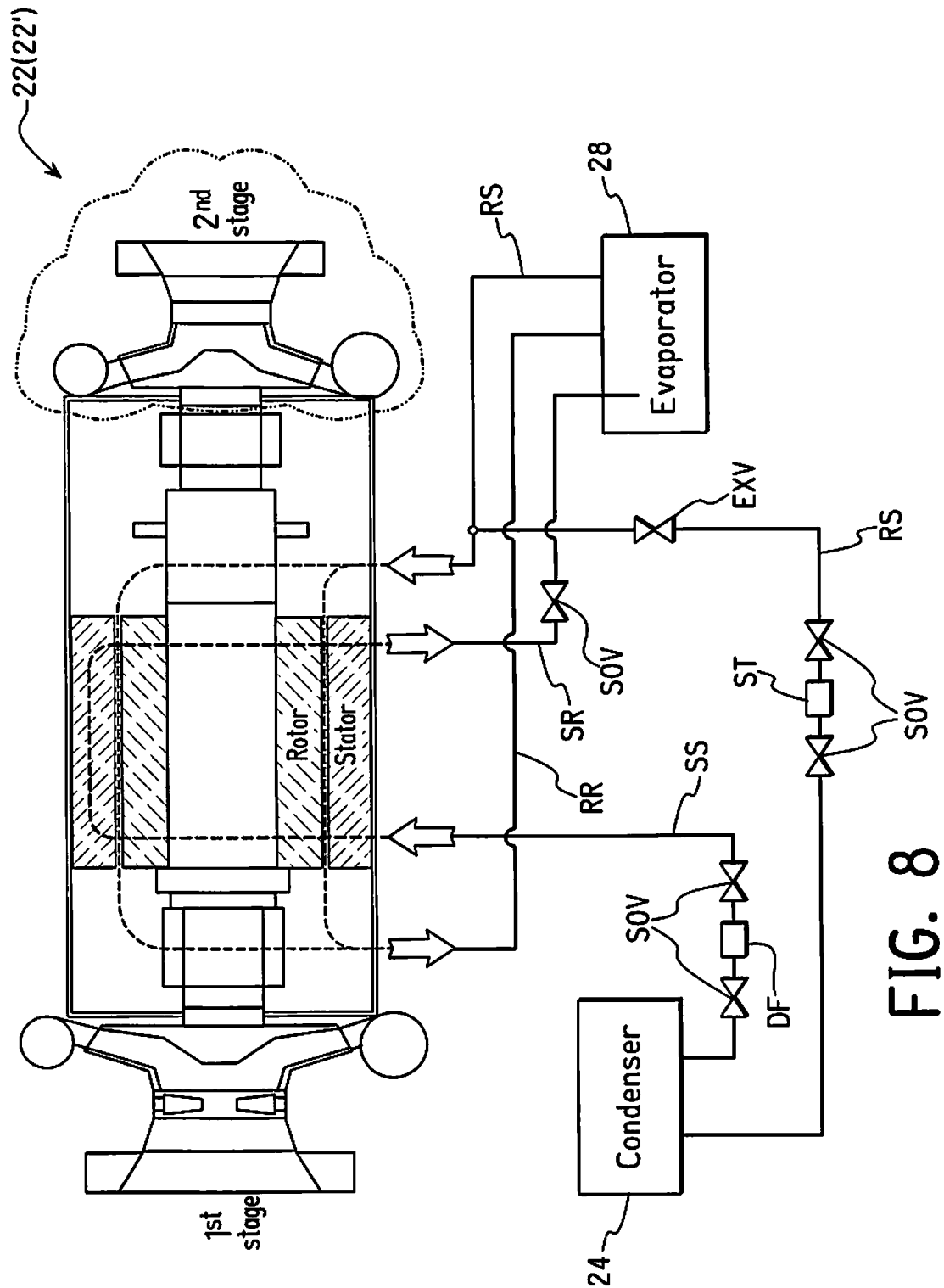
FIG. 8 is partial schematic diagram illustrating a combination of the first and third options of stator and rotor cooling flow paths applicable to the chiller systems of FIGS. 1 and 2, with the second stage shown in a phantom circle to illustrate that the second stage is only present in FIG. 2.

In FIG. 8 the rotor supply line RS delivers cooling fluid from the condenser 24 and from the evaporator 28 to the motor 38 via a branch point. In this option, the rotor supply line RS from the condenser includes solenoid valves SOV sandwiching a strainer ST therebetween, and with an expansion valve EXV downstream. Thus, this delivery applies to the single stage chiller 10 or the two stage chiller system 10'.

Figure 9:
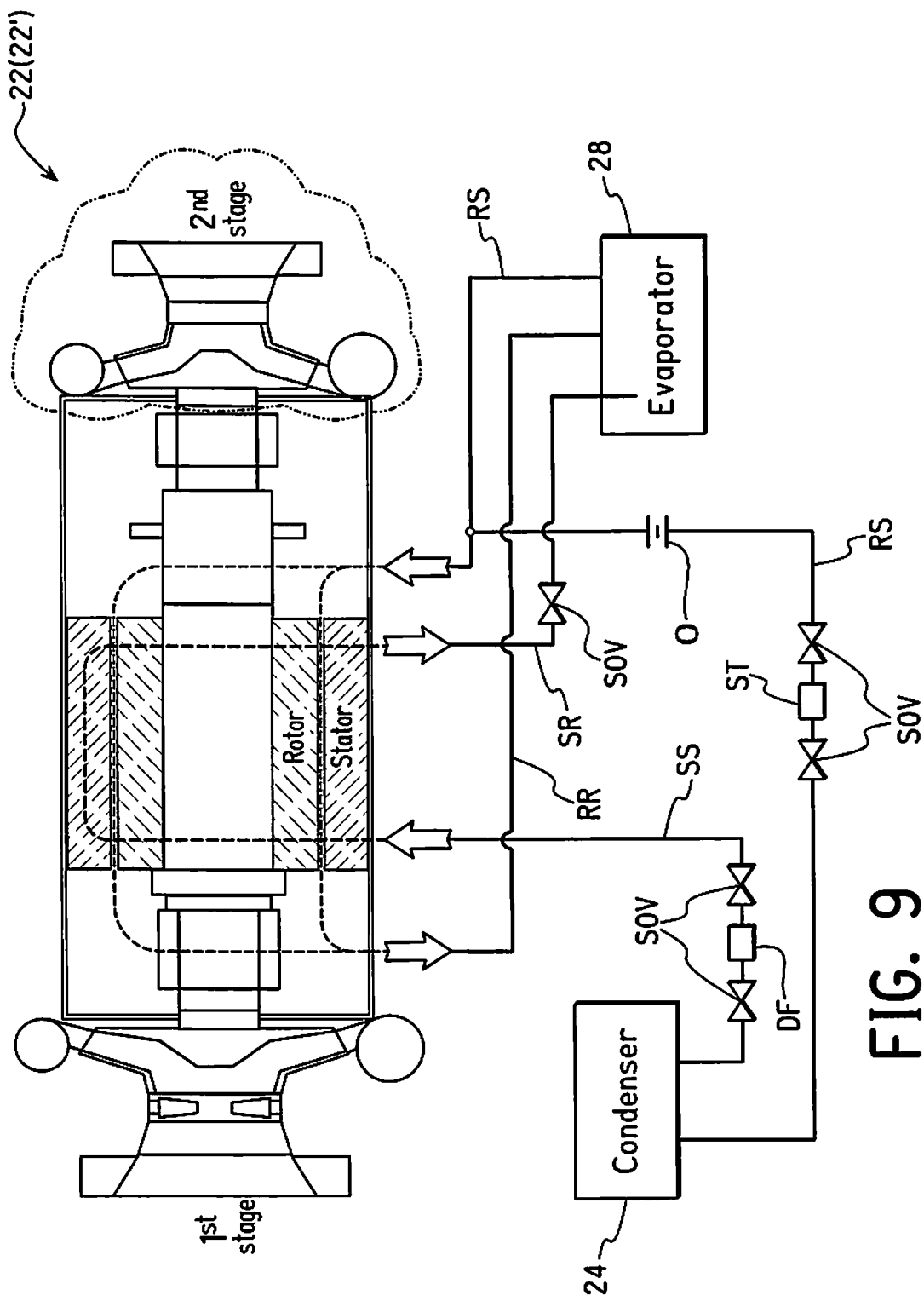
FIG. 9 is partial schematic diagram illustrating a combination of the first and fourth options of stator and rotor cooling flow paths applicable to the chiller systems of FIGS. 1 and 2, with the second stage shown in a phantom circle to illustrate that the second stage is only present in FIG. 2.

In FIG. 9 the rotor supply line RS delivers cooling fluid from the condenser 24 and from the evaporator 28 to the motor 38 via a branch point. In this option, the rotor supply line RS from the condenser includes solenoid valves SOV sandwiching a strainer ST therebetween, and with an Orifice O downstream. Thus, this delivery applies to the single stage chiller 10 or the two stage chiller system 10'.

Figure 10:
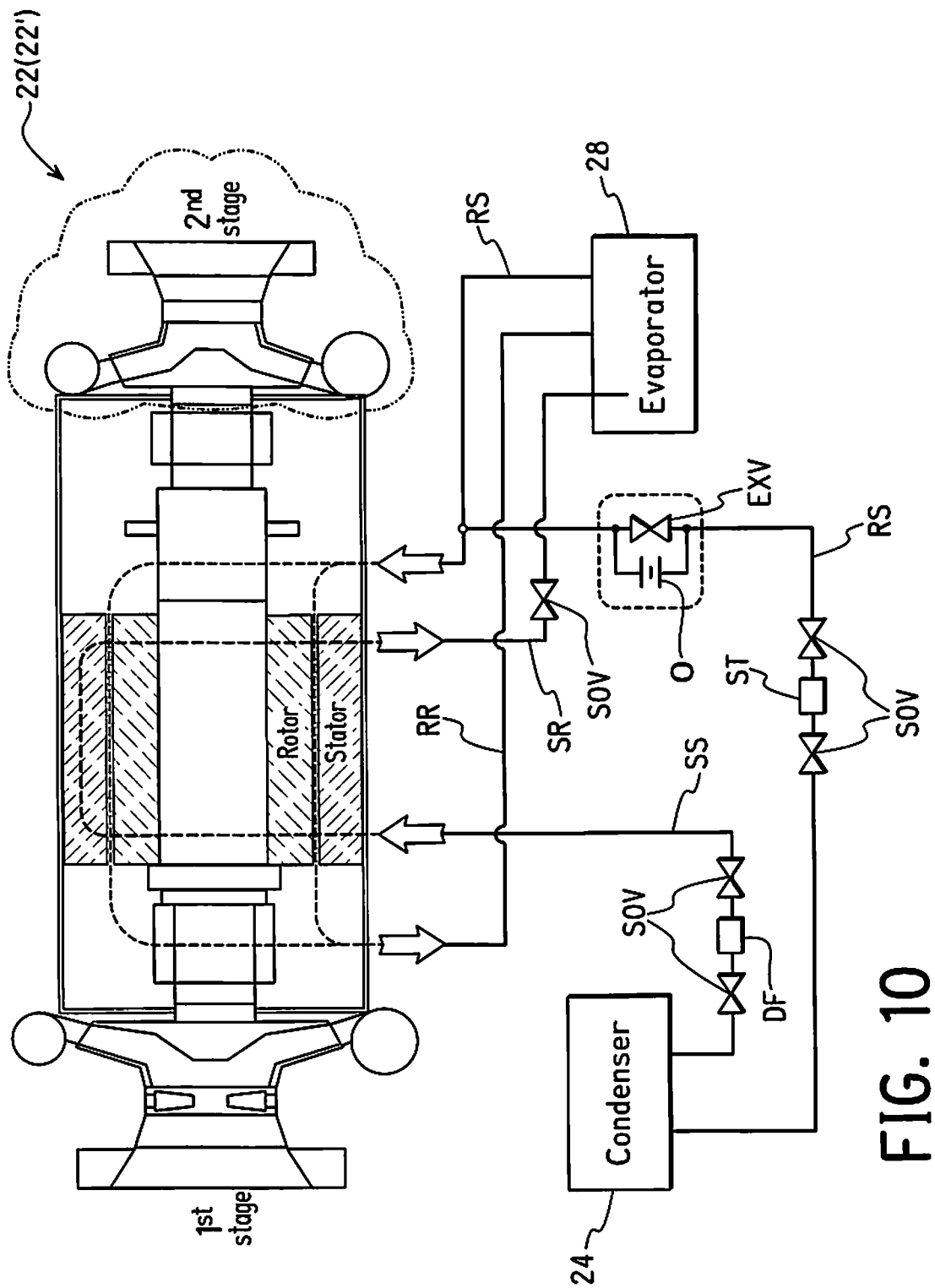
FIG. 10 is partial schematic diagram illustrating a combination of the first and fifth options of stator and rotor cooling flow paths applicable to the chiller systems of FIGS. 1 and 2, with the second stage shown in a phantom circle to illustrate that the second stage is only present in FIG. 2.

In FIG. 10 the rotor supply line RS delivers cooling fluid from the condenser 24 and from the evaporator 28 to the motor 38 via a branch point. In this option, the rotor supply line RS from the condenser includes solenoid valves SOV sandwiching a strainer ST therebetween, and with parallel mounted expansion valve EXV and orifice O downstream. Thus, this delivery applies to the single stage chiller 10 or the two stage chiller system 10'.

Figure 11:
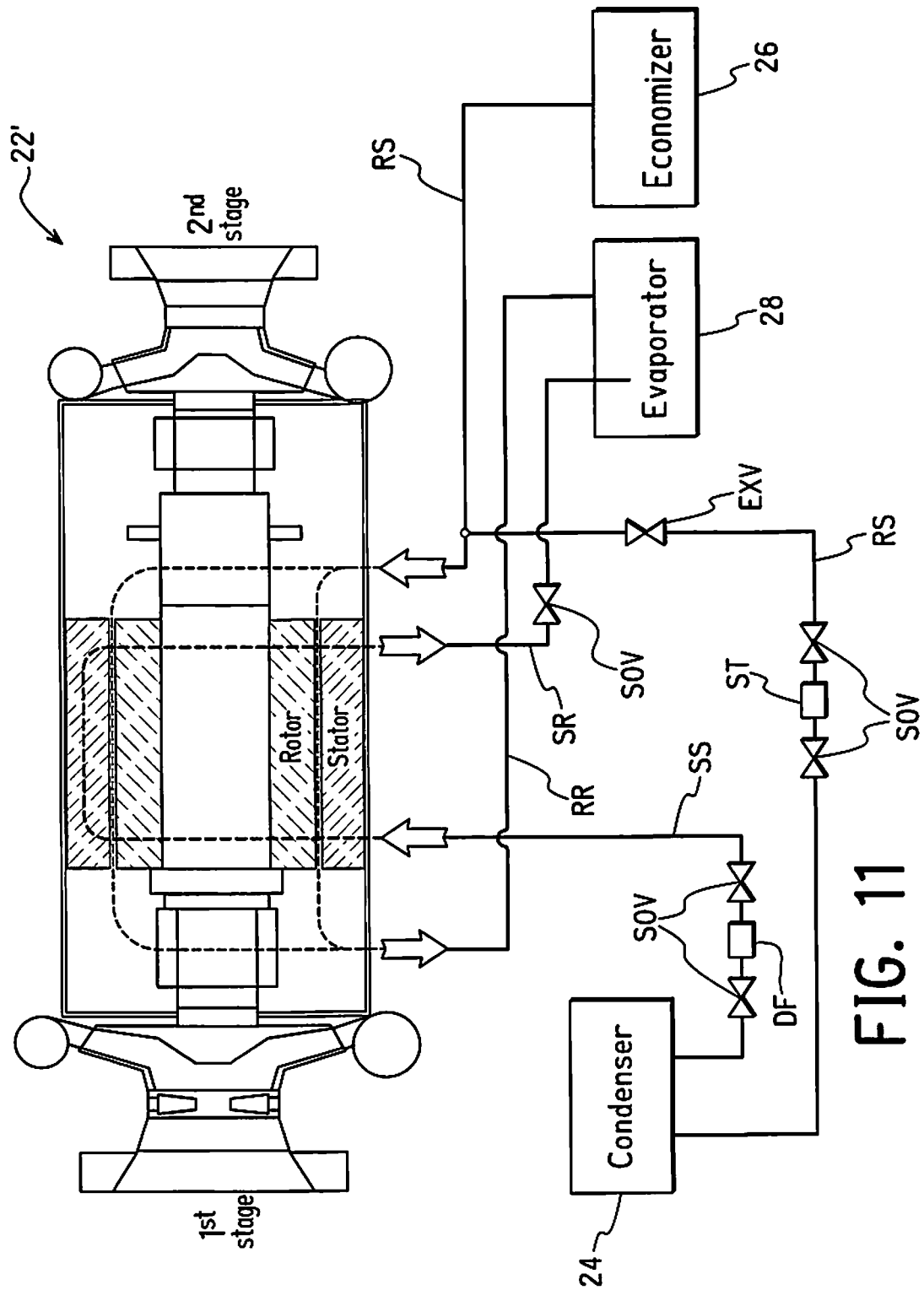
FIG. 11 is partial schematic diagram illustrating a combination of the second and third options of stator and rotor cooling flow paths applicable to the chiller system of FIG. 2.

In FIG. 11 the rotor supply line RS delivers cooling fluid from the condenser 24 and from the economizer 26 to the motor 38 via a branch point. In this option, the rotor supply line RS from the condenser includes solenoid valves SOV sandwiching a strainer ST therebetween, and with an expansion valve EXV downstream. Thus, this delivery applies to the single stage chiller 10 or the two stage chiller system 10'.

Figure 12:
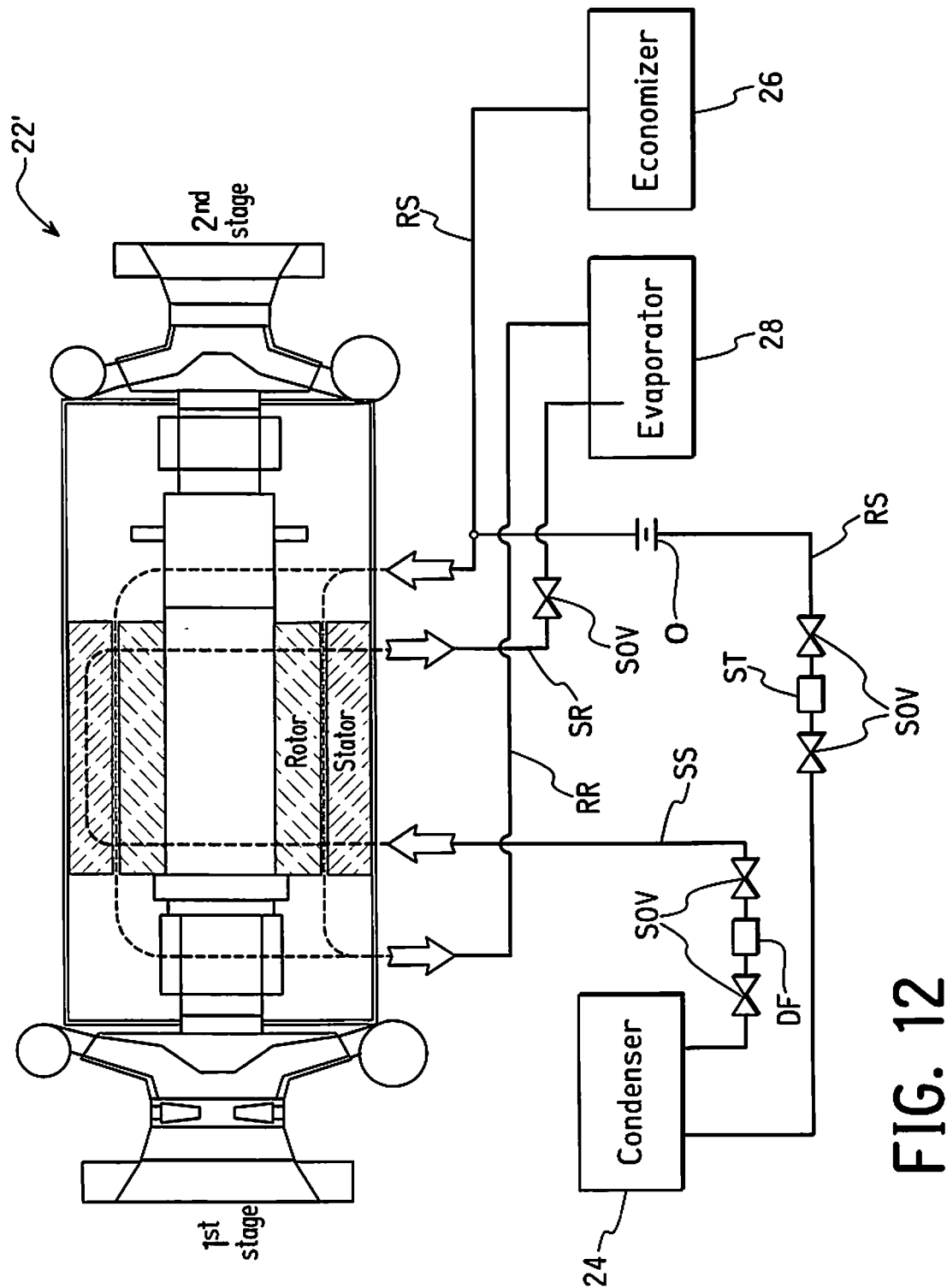
FIG. 12 is partial schematic diagram illustrating a combination of the second and fourth options of stator and rotor cooling flow paths applicable to the chiller system of FIG. 2.

In FIG. 12 the rotor supply line RS delivers cooling fluid from the condenser 24 and from the economizer 26 to the motor 38 via a branch point. In this option, the rotor supply line RS from the condenser includes solenoid valves SOV sandwiching a strainer ST therebetween, and with an Orifice O downstream. Thus, this delivery applies to the two stage chiller system 10'.

Figure 13:
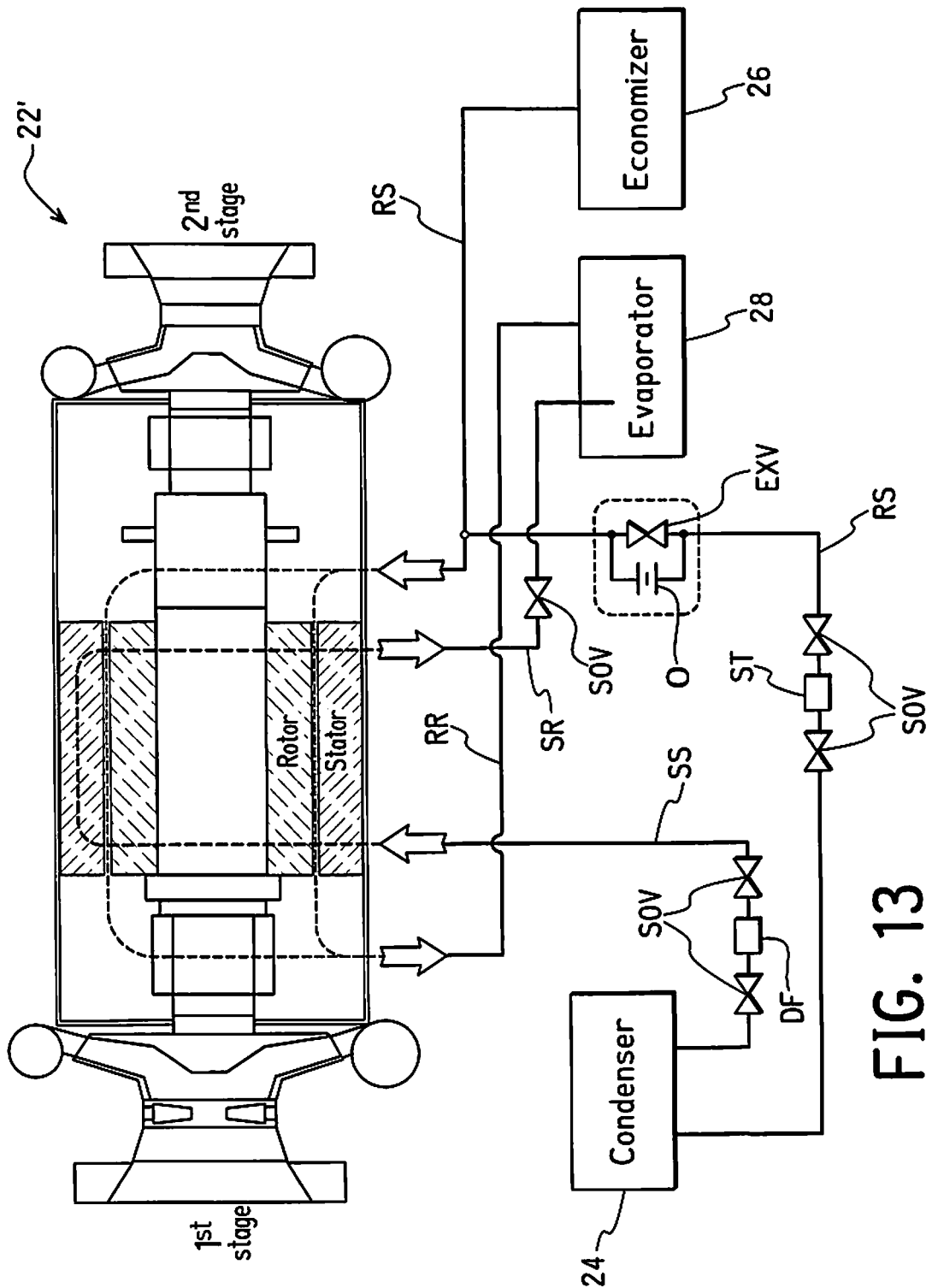
FIG. 13 is partial schematic diagram illustrating a combination of the second and fifth options of stator and rotor cooling flow paths applicable to the chiller system of FIG. 2.
Figure 14:
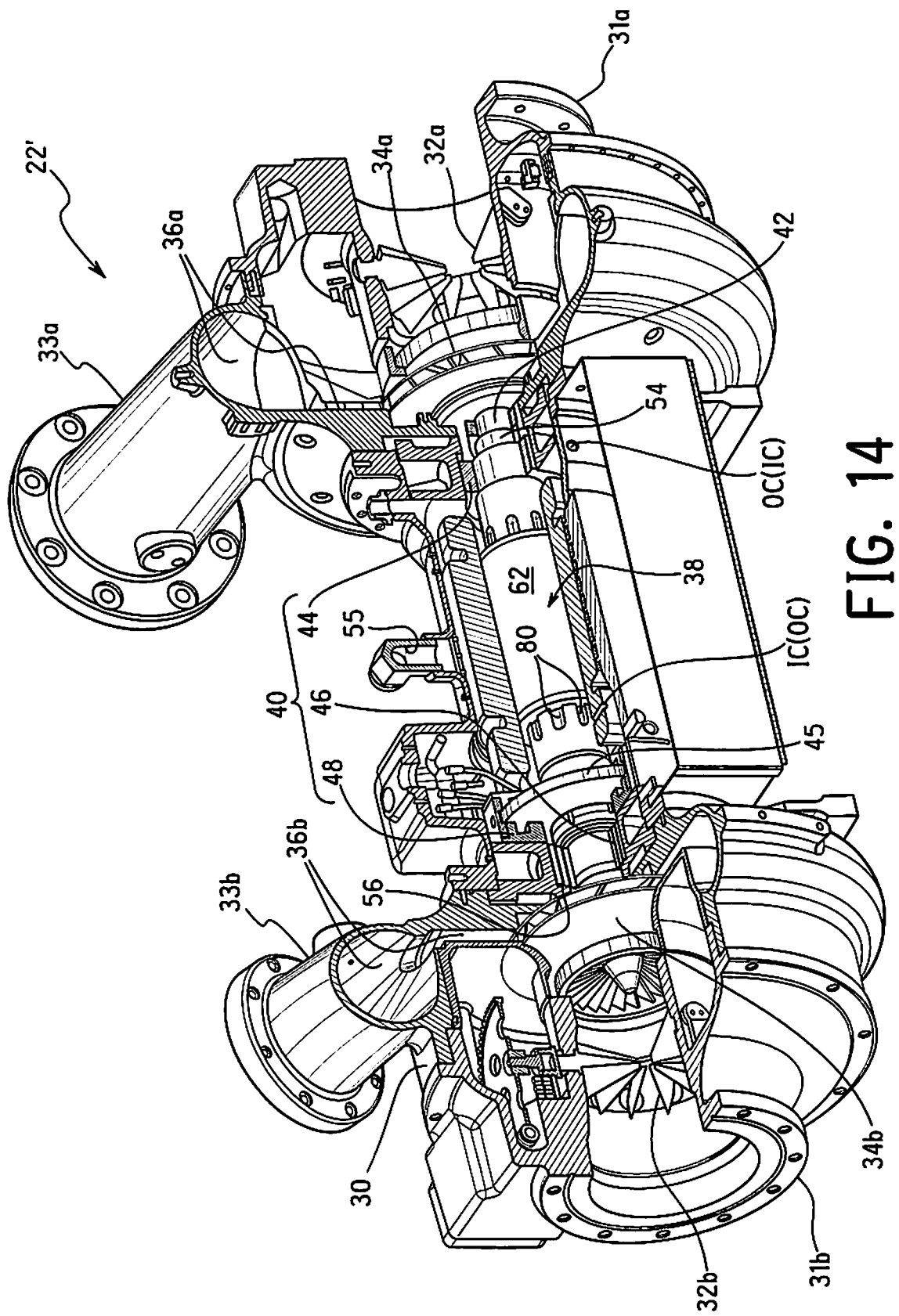
FIG. 14 is a perspective view of the centrifugal compressor of the chiller system illustrated in FIG. 2, with portions broken away and shown in cross-section for the purpose of illustration.

In FIG. 13 the rotor supply line RS delivers cooling fluid from the condenser 24 and from the economizer 26 to the motor 38 via a branch point. In this option, the rotor supply line RS from the condenser includes solenoid valves SOV sandwiching a strainer ST therebetween, and with parallel mounted expansion valve EXV and orifice O downstream. Thus, this delivery applies to the two stage chiller system 10'.

The controller 20 may control the valves and/or the orifice size may be set to delivery the correct amount of refrigerant. The stator supply SS, the stator return SR, the least one rotor supply RS and the rotor return RR as well as the parts disposed therein form parts of a cooling medium delivery structure in accordance with the present invention. The cooling medium delivery structure further includes an inlet conduit IC located to supply the cooling medium to a first axial end of the motor 38 and an outlet conduit OC located to discharge the cooling medium from a second axial end of the motor 38, as best understood from FIGS. 3-16. The inlet conduit IC is located to supply the cooling medium from the first axial end of the motor 38 through the gap G and the at least one axial passageway (e.g., formed by the grooves 80) to the second axial end of the motor 38 to cool the rotor 62, and the outlet conduit OC is located to discharge the cooling medium supplied to the second axial end of the motor 38 from the gap G and the at least one axial passageway (e.g., formed by the grooves 80). Of course, the first and second axial ends can be reversed as shown in FIGS. 15A-15B and 16A-16B. The conduits IC and OC can supply/discharge cooling medium to/from both the gap G and the grooves 80, or additional conventional conduits (e.g., like those previously used to deliver fluid to a gap) can be provided for the gap G.

In the illustrated embodiment, the cooling medium delivery structure does not include a pump. In addition, in the illustrated embodiment, at least a portion of the inlet conduit (IC) is axially disposed closer to one of the first or third magnetic bearing elements 44 or 48 than the first axial end of the motor 38, depending on which direction the cooling medium flows. At least a portion of the outlet conduit OC is axially disposed closer to one of the second or third magnetic bearing elements 46 or 48 than the second axial end of the motor 38, depending on which direction the cooling medium flows. In the illustrated embodiment, the third axial thrust bearing element 48 is axially disposed between one of the first and second radial magnetic bearing elements 44 and 46 and one of the first and second axial ends of the motor 38, respectively.

Referring to FIGS. 1 and 2, the chiller controller 20 may include numerous control sections programmed to control the conventional parts in a conventional manner. For example, a conventional magnetic bearing control section, a conventional compressor variable frequency drive, a conventional compressor motor control section, a conventional inlet guide vane control section, and a conventional expansion valve control section. These sections can be separate or combined sections.

In the illustrated embodiment, the control sections are sections of the chiller controller 20 programmed to execute the control of the parts described herein. However, it will be apparent to those skilled in the art from this disclosure that the precise number, location and/or structure of the control sections, portions and/or chiller controller 20 can be changed without departing from the present invention so long as the one or more controllers are programed to execute control of the parts of the chiller system 10 as explained herein.

The chiller controller 20 is conventional, and thus, includes at least one microprocessor or CPU, an Input/output (I/O) interface, Random Access Memory (RAM), Read Only Memory (ROM), a storage device (either temporary or permanent) forming a computer readable medium programmed to execute one or more control programs to control the chiller system 10. The chiller controller 20 may optionally include an input interface such as a keypad to receive inputs from a user and a display device used to display various parameters to a user. The parts and programming are conventional, and thus, will not be discussed in detail herein, except as needed to understand the embodiment(s).

In terms of global environment protection, use of new low GWP (Global Warming Potential) refrigerants such like R1233zd, R1234ze are considered for chiller systems. One example of the low global warming potential refrigerant is low pressure refrigerant in which the evaporation pressure is equal to or less than the atmospheric pressure. For example, low pressure refrigerant R1233zd is a candidate for centrifugal chiller applications because it is non-flammable, non-toxic, low cost, and has a high COP compared to other candidates such like R1234ze, which are current major refrigerant R134a alternatives. In the illustrated embodiment, the cooling medium is refrigerant used in the chiller system 10 or 10'. Preferably the refrigerant is at least one of a low pressure refrigerant (LPR) and a low global warming potential (GWP) refrigerant. More specifically, the low pressure refrigerant (LPR) may be R1233zd and/or the low global warming potential (GWP) refrigerant may be R1234ze or R1234yf.

Figure 26:
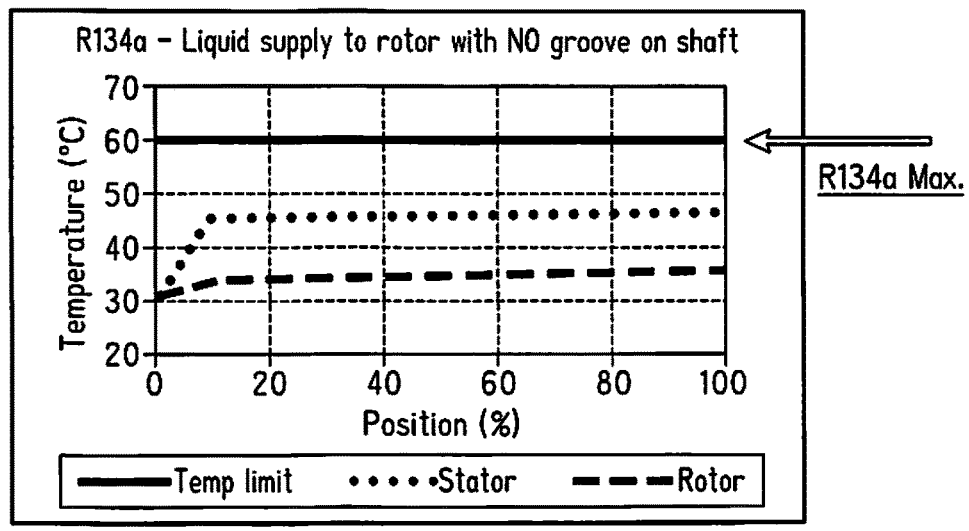
FIG. 26 is a chart illustrating stator and rotor temperatures in the conventional compressor of FIG. 25, when R134a is the refrigerant.
Figure 27:
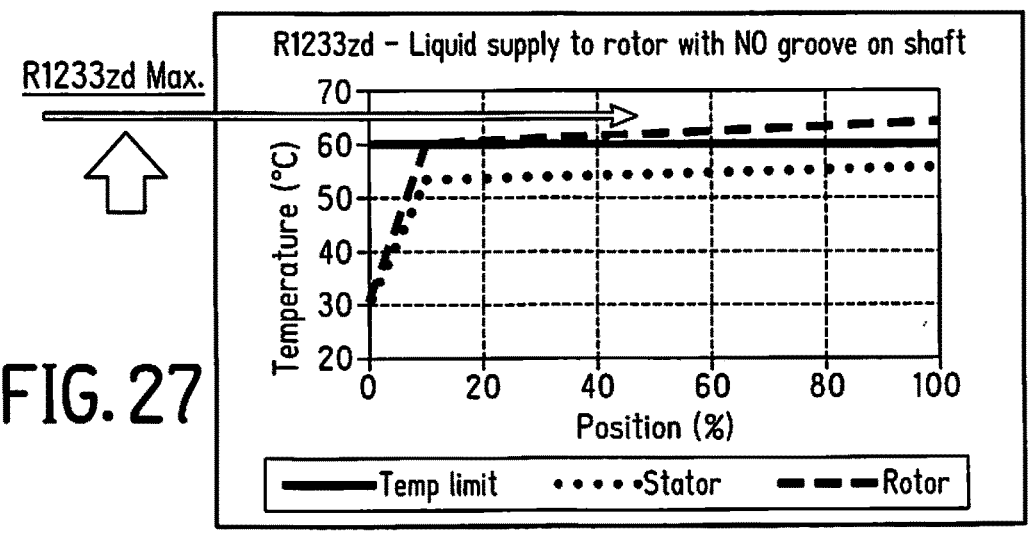
FIG. 27 is a chart illustrating stator and rotor temperatures in the conventional compressor of FIG. 25, when R1233zd is the refrigerant.
Figure 28:
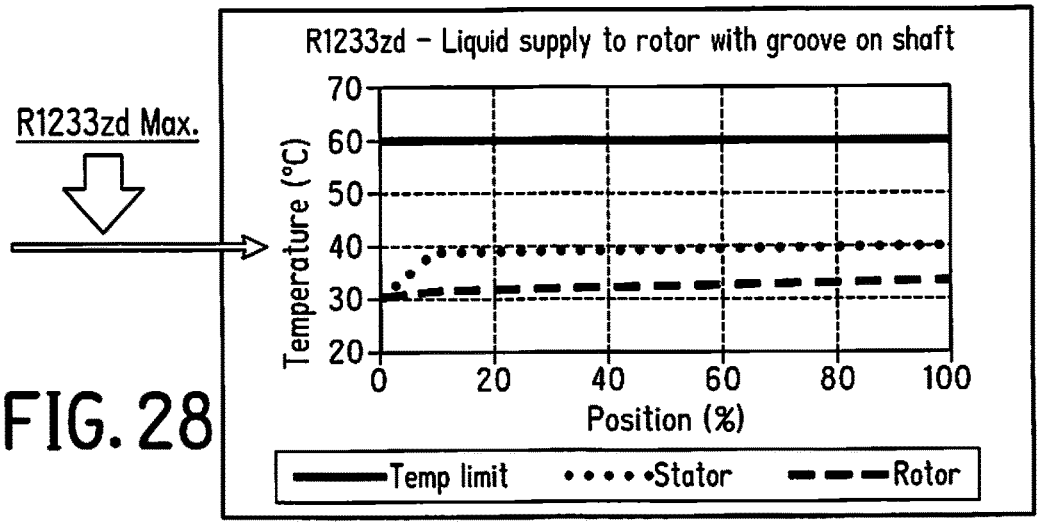
FIG. 28 is a chart illustrating stator and rotor temperatures in the conventional compressor of FIG. 25, when R134a is the refrigerant.

Referring now to FIGS. 26-28, a conventional motor using R134a is illustrated in FIG. 26, a conventional motor using R1233zd is illustrated in FIG. 27, and a motor in accordance with the present invention using R1233zd is illustrated in FIG. 28. As shown in the Figure, when cooling is performed in the same shape, sufficient cooling is performed, for example, with respect to the temperature limit of 60° C. in R134a as shown in the FIG. 26; however, the temperature limit is exceeded in R1233zd as shown in the FIG. 27. This is because R134a is capable of supplying the refrigerant supply amount of, for example, 0.48 kg/s, whereas R1233zd is only capable of supplying 0.18 kg/s (approximately one-third). The difference in pressure (high pressure–low pressure) is used in supplying the refrigerant; thus, the absolute supply amount decrease in R1233zd. Also, when a groove is absent, the rotor cooling heat transfer part will be the outer surface of the rotor only. This lack of heat transfer area influences the temperature increase in R1233zd. As shown in FIG. 28, when a groove is provided in the shaft, the inner temperature of the motor 38 will be sufficiently cooled. By providing a groove in the shaft, the passage area inside the refrigerant increases and the refrigerant supply amount increases. By providing a groove in the shaft, the rotor is cooled from the outside and from the inside of the rotor.

Regarding the distance from the magnetic bearing—normally, magnetic bearings are disposed at three positions in total, that is, radial magnetic bearings 1, 2 and thrust magnetic bearing 3. For cooling of the magnetic bearing, the following arrangement is preferred as shown in FIGS. 15A-15B and 16A-16B. Arrange the refrigerant supply port (e.g., inlet conduit IC) and the exhaust port (e.g., outlet conduit OC) as close as possible to the magnetic bearing. Arrange the shaft groove 80 and the magnetic bearing such that the distance between them is also as small as possible. As shown in the examples of FIGS. 15A-15B and 16A-16B, the positions of the refrigerant supply/exhaust ports can be switched in accordance with the rotor load or the load on each magnetic bearing, and such switching can be performed during operation.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A compressor comprising:
a compression mechanism that compresses refrigerant when rotated;
a shaft rotatable about a rotation axis and attached to the compression mechanism to rotate a part of the compression mechanism, the shaft having a first portion and a second portion smaller than the first portion;
a motor arranged to rotate the shaft, the motor including a rotor mounted on the shaft and a stator disposed radially outwardly of the rotor to form a gap between the rotor and the stator; and
a cooling medium delivery structure including an inlet conduit located to supply a cooling medium to the motor and an outlet conduit located to discharge the cooling medium from the motor,
the shaft having an external shape different than an internal shape of the rotor to form at least one axial passageway between the shaft and the rotor along an axial length of the shaft at least as long as an axial length of the rotor, the at least one axial passageway extending along the first and second portions of the shaft, and the first portion being arranged axially adjacent the second portion so that the at least one axial passageway extends in series along the first portion and the second portion of the shaft, and the inlet conduit being located to supply the cooling medium through the gap and the at least one axial passageway to cool the rotor, and the outlet conduit being located to discharge the cooling medium from the gap and the at least one axial passageway.

2. The compressor according to claim 1, wherein
the external shape of the shaft is different than the internal shape of the rotor to form a plurality of axial passageways between the shaft and the rotor along the axial length of the shaft at least as long as the axial length of the rotor.

3. The compressor according to claim 2, wherein
the external shape of the shaft is an annular shape and a plurality of grooves extend radially inwardly from the annular shape.

4. The compressor according to claim 3, wherein
the grooves are substantially equally spaced from each other along a circumferential direction about the annular shape.

5. The compressor according to claim 3, wherein
each of the grooves includes a first sidewall, a second sidewall circumferentially spaced from the first sidewall and a trough wall connecting radially inner ends of the first and second sidewalls.

6. The compressor according to claim 5, wherein
the first sidewall of each groove is substantially parallel to the second sidewall of the groove as viewed in axial cross section.

7. The compressor according to claim 3, wherein
a total cross sectional area of the plurality of grooves is larger than a total cross sectional area of the gap as viewed in axial cross section.

8. The compressor according to claim 7, wherein
the total cross sectional area of the plurality of grooves is approximately double the total cross sectional area of the gap as viewed in axial cross section.

9. The compressor according to claim 1, wherein
a total cross sectional area of the at least one axial passageway is larger than a total cross sectional area of the gap as viewed in axial cross section.

10. The compressor according to claim 9, wherein
the total cross sectional area of the at least one axial passageway is approximately double the total cross sectional area of the gap as viewed in axial cross section.

11. The compressor according to claim 1, wherein
the cooling medium is refrigerant used in compressor.

12. The compressor according to claim 11, wherein
the refrigerant is a low pressure refrigerant (LPR).

13. The compressor according to claim 12, wherein
the low pressure refrigerant (LPR) is R1233zd.

14. The compressor according to claim 11, wherein
the refrigerant is a low global warming potential (GWP) refrigerant.

15. The compressor according to claim 14, wherein
the low global warming potential (GWP) refrigerant is R1234ze or R1234yf.

16. The compressor according to claim 11, wherein
the cooling medium delivery structure does not include a pump.

17. The compressor according to claim 11, further comprising
a magnetic bearing rotatably supporting the shaft.

18. The compressor according to claim 17, wherein
the magnetic bearing includes
a first radial magnetic bearing element disposed on a first axial end of the motor,
a second radial magnetic bearing element disposed on a second axial end of the motor, and
a third axial thrust bearing element disposed on one of the first and second axial ends of the motor.

19. The compressor according to claim 18, wherein
at least a portion of the inlet conduit is axially disposed closer to one of the first or third magnetic bearing elements than the first axial end of the motor.

20. The compressor according to claim 18, wherein
at least a portion of the outlet conduit is axially disposed closer to one of the second or third magnetic bearing elements than the second axial end of the motor.

21. A compressor comprising:
a compression mechanism that compresses refrigerant when rotated;
a shaft rotatable about a rotation axis and attached to the compression mechanism to rotate a part of the compression mechanism, the shaft having a first portion and a second portion smaller than the first portion;
a motor arranged to rotate the shaft, the motor including a rotor mounted on the shaft and a stator disposed radially outwardly of the rotor to form a gap between the rotor and the stator; and
a cooling medium delivery structure including an inlet conduit located to supply a cooling medium to the motor and an outlet conduit located to discharge the cooling medium from the motor,
the shaft having an external shape different than an internal shape of the rotor to form at least one axial passageway between the shaft and the rotor along an axial length of the shaft at least as long as an axial length of the rotor, the at least one axial passageway extending along the first and second portions of the shaft,
the inlet conduit being located to supply the cooling medium through the gap and the at least one axial passageway to cool the rotor, and the outlet conduit being located to discharge the cooling medium from the gap and the at least one axial passageway, wherein the external shape of the shaft is an annular shape and a plurality of grooves extend radially inwardly from the annular shape,
each of the grooves including a first sidewall, a second sidewall circumferentially spaced from the first sidewall and a trough wall connecting radially inner ends of the first and second sidewalls, and
each groove having a centerline equally spaced from the first and second sidewalls as viewed in axial cross section, and the centerline of each groove is inclined relative to a radial direction of the shaft.

22. The compressor according to claim 21, wherein
the shaft rotates in a positive rotation direction during operation, and
each centerline is inclined so that a radially outer end is disposed circumferentially further in the positive rotational direction than a radially inner end of the centerline.

23. The compressor according to claim 21, wherein
the shaft rotates in a positive rotation direction during operation, and
each centerline is inclined so that a radially inner end is disposed circumferentially further in the positive rotational direction than a radially outer end of the centerline.

24. A compressor comprising:
a compression mechanism that compresses refrigerant when rotated;

a shaft rotatable about a rotation axis and attached to the compression mechanism to rotate a part of the compression mechanism, the shaft having a first portion and a second portion smaller than the first portion, and the shaft rotating in a positive rotation direction during operation;

a motor arranged to rotate the shaft, the motor including a rotor mounted on the shaft and a stator disposed radially outwardly of the rotor to form a gap between the rotor and the stator; and a cooling medium delivery structure including an inlet conduit located to supply a cooling medium to the motor and an outlet conduit located to discharge the cooling medium from the motor, the shaft having an external shape different than an internal shape of the rotor to form at least one axial passageway between the shaft and the rotor along an axial length of the shaft at least as long as an axial length of the rotor, the at least one axial passageway extending along the first and second portions of the shaft, the inlet conduit being located to supply the cooling medium through the gap and the at least one axial passageway to cool the rotor and the outlet conduit being located to discharge the cooling medium from the gap and the at least one axial passageway, wherein the external shape of the shaft is an annular shape and a plurality of grooves extend radially inwardly from the annular shape, each of the grooves including a first sidewall, a second sidewall circumferentially spaced from the first sidewall and a trough wall connecting radially inner ends of the first and second sidewalls, and at least one of the first sidewall and the second sidewall of each groove being angled so that a radially outer end is disposed circumferentially further in the positive rotational direction than a radially inner end.

25. A compressor comprising:
a compression mechanism that compresses refrigerant when rotated;

a shaft rotatable about a rotation axis and attached to the compression mechanism to rotate a part of the compression mechanism, the shaft having a first portion and a second portion smaller than the first portion, and the shaft rotating in a positive rotation direction during operation;

a motor arranged to rotate the shaft, the motor including a rotor mounted on the shaft and a stator disposed radially outwardly of the rotor to form a gap between the rotor and the stator; and a cooling medium delivery structure including an inlet conduit located to supply a cooling medium to the motor and an outlet conduit located to discharge the cooling medium from the motor, the shaft having an external shape different than an internal shape of the rotor to form at least one axial passageway between the shaft and the rotor along an axial length of the shaft at least as long as an axial length of the rotor, the at least one axial passageway extending along the first and second portions of the shaft, the inlet conduit being located to supply the cooling medium through the gap and the at least one axial passageway to cool the rotor, and the outlet conduit being located to discharge the cooling medium from the gap and the at least one axial passageway, wherein the external shape of the shaft is an annular shape and a plurality of grooves extend radially inwardly from the annular shape, each of the grooves including a first sidewall, a second sidewall circumferentially spaced from the first sidewall and a trough wall connecting radially inner ends of the first and second sidewalls, and at least one of the first sidewall and the second sidewall of each groove being angled so that a radially inner end is disposed circumferentially further in the positive rotational direction than a radially outer end.

* * * * *